(12) United States Patent
Tiessen et al.

(10) Patent No.: US 11,976,202 B2
(45) Date of Patent: May 7, 2024

(54) METHOD OF IMPROVING ACTINIC CURE OF ENERGY CURABLE INKS AND COATINGS

(71) Applicant: SUN CHEMICAL CORPORATION, Parsippany, NJ (US)

(72) Inventors: John G. Tiessen, Northlake, IL (US); Juanita M. Parris, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/761,005

(22) PCT Filed: Apr. 14, 2021

(86) PCT No.: PCT/US2021/027201
§ 371 (c)(1),
(2) Date: Mar. 16, 2022

(87) PCT Pub. No.: WO2021/211662
PCT Pub. Date: Oct. 21, 2021

(65) Prior Publication Data
US 2022/0340768 A1    Oct. 27, 2022

Related U.S. Application Data

(60) Provisional application No. 63/010,152, filed on Apr. 15, 2020.

(51) Int. Cl.
*C09D 11/101* (2014.01)
*B41M 7/00* (2006.01)

(52) U.S. Cl.
CPC .......... *C09D 11/101* (2013.01); *B41M 7/0081* (2013.01)

(58) Field of Classification Search
CPC .......................... C09D 11/101; B41M 7/0081
See application file for complete search history.

(56) References Cited

U.S. PATENT DOCUMENTS

| | | | |
|---|---|---|---|
| 4,105,806 A | 8/1978 | Watt | |
| 6,245,827 B1 | 6/2001 | Gregory | |
| 7,214,725 B2 | 5/2007 | Narayan-Sarathy | |
| (Continued) | | | |

FOREIGN PATENT DOCUMENTS

| CN | 105017487 | 11/2015 |
|---|---|---|
| JP | S62-047590 | 10/1987 |
| (Continued) | | |

OTHER PUBLICATIONS

International Search Report issued in International Application No. PCT/US2021/027201, dated Jul. 19, 2021.
(Continued)

*Primary Examiner* — Robert S Walters, Jr.
(74) *Attorney, Agent, or Firm* — Marian E. Fundytus; Ostrolenk Faber LLP.

(57) ABSTRACT

Layers of energy curable inks and coatings containing little to no photoinitiator, are printed over or are covered with ink or coating layers that are not energy curable but do comprise a photoinitiator. All energy curable inks are then simultaneously cured when exposed to actinic radiation that passes through the ink or coating layers that are not energy curable but comprise photoinitiators.

15 Claims, 6 Drawing Sheets

(56) References Cited

U.S. PATENT DOCUMENTS

| | | | |
|---|---|---|---|
| 8,153,195 B2 | 4/2012 | Matt | |
| 2005/0079293 A1* | 4/2005 | Baumgart | C08G 18/6254 427/553 |
| 2019/0389236 A1 | 12/2019 | Tiessen | |

FOREIGN PATENT DOCUMENTS

| | | |
|---|---|---|
| JP | 2010-506748 | 3/2010 |
| JP | 2020-512182 | 4/2020 |
| WO | WO 2012/060390 | 5/2012 |
| WO | WO 2008/030555 A2 | 3/2018 |
| WO | WO 2018/042193 A1 | 3/2018 |
| WO | WO 2018/165068 A1 | 9/2018 |

OTHER PUBLICATIONS

Written Opinion of the International Searching Authority issued in International Application No. PCT/US2021/027201, dated Jul. 19, 2021.

International Preliminary Report on Patentability (Chapter 1 of the Patent Cooperation Treaty) issued in International Application No. PCT/US2021/027201, dated Mar. 3, 2022.

Xinhua Liu, Bin He, Haifeng Tang & Qigang Wang, "Tough nanocomposite ionogel-based actuator exhibits robust performance", *Scientific Reports*, 4:6673 (2014).

Yuan Hua, Guo Wenxun, and Gao Peng, "Synthesis of a Self-Initiated UV-curing Polymer," Applied Chemical Industry, vol. 40, Issue 7, pp. 1180-1182, 1204; (2011).

G. Douglass Dixon and Nancy W. Carlson, "Deep Section Polymerization Initiated by Surface Irradiation, Part 1 Monomers," RadTech Report, vol. 13, Issue 2, pp. 28-32, (1999).

Japanese Office Action issued in counterpart JP application No. 2022-562840, dated Jul. 24, 2023 with English language translation thereof.

\* cited by examiner

Ink weight (g/m²) vs. measured color density of cyan ink

Ink weight (g/m$^2$) vs. measured color density of magenta ink

Ink weight (g/m²) vs. measured color density of yellow ink

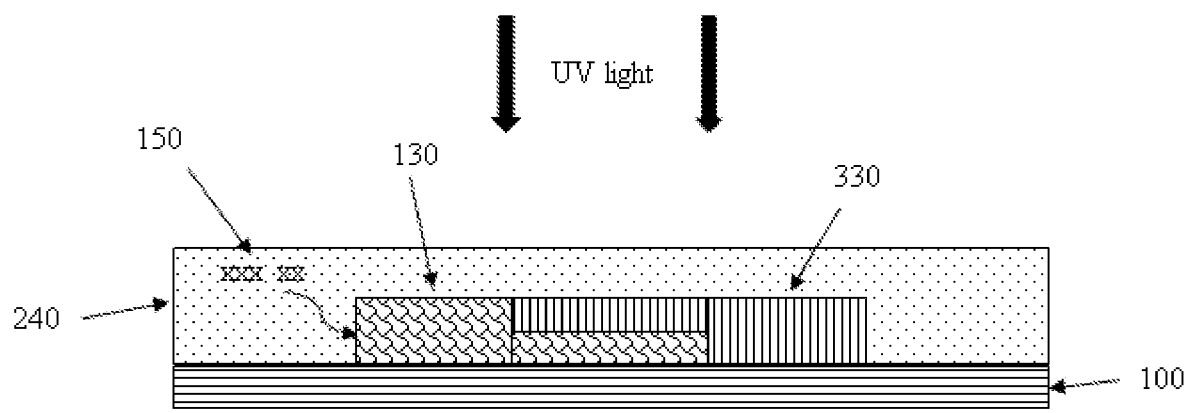

METHOD OF IMPROVING ACTINIC CURE OF ENERGY CURABLE INKS AND COATINGS

CROSS REFERENCE TO RELATED APPLICATIONS

The present application is a § 371 National Phase application based on PCT/US2021/027201 filed Apr. 14, 2021, which claims the benefit of U.S. Provisional Application No. 63/010,152, filed Apr. 15, 2020 the subject matter of each of which is incorporated by reference in their entirety.

FIELD OF THE INVENTION

The present application is related to the printing and cure of multiple layers of energy curable inks and/or coatings on a substrate.

BACKGROUND OF THE INVENTION

Substrates are often printed with multiple layers of inks and/or coatings. Typically, when using energy-curable inks and/or coatings, each layer is cured before the next layer is applied. Typically, energy curable (EC) inks and/or coatings must contain photoinitiators to enable adequate cure. However, photoinitiator residue left after cure may compromise the solvent resistance of the cured ink or coating by acting as a plasticizer. In addition, in packaging articles, for example food products, pharmaceuticals and cosmetics, unreacted photoinitiator and photoinitiator fragments may migrate through the printed substrate and contaminate the product contained therein.

To reduce the amount of photoinitiators used in EC inks and/or coatings, attempts have been made to make "self-initiated" EC polymers, polymers that do not need photoinitiators to cure under actinic radiation, for use as binder in the inks or coatings. Despite advancements in this area, none of the proposed solutions is adequate to achieve the necessary resistance properties, etc., required of articles prepared with multiple layers of inks and/or coatings.

CN 105017487 discloses polymerization of a polyurethane prepared from polyester diol with a silane coupling agent using a tin catalyst to generate free radicals under UV radiation and trigger double bond polymerization.

Xinhua Liu, Bin He, Haifeng Tang & Qigang Wang, "Tough nanocomposite ionogel-based actuator exhibits robust performance", *Scientific Reports*, 4:6673 (2014), discloses the use of $TiO_2$ nanoparticles under UV radiation to initiate radicals in a mixture of 2-hydroxyethyl methacrylate (HEMA) and 1-butyl-3-methylimidazolium tetrafluoroborate ($BMIMBF_4$) causing crosslinking of the acrylate and formation of a $BMIMBF_4$ ionogel.

Yuan Hua, Guo Wenxun, and Gao Peng, "Synthesis of a Self-Initiated UV-curing Polymer," Applied Chemical Industry, Volume 40, Issue 7, Pages 1180-1182, 1204; (2011) discloses an unsaturated polyester-urea copolymer that will cure to a good hardness upon 30-60 seconds of exposure to UV, presumably by self-initiated UV curing. The components include propylene glycol, urea, phthalic anhydride, maleic anhydride and sebacic acid.

G. Douglass Dixon and Nancy W. Carlson, "Deep Section Polymerization Initiated by Surface Irradiation, Part 1 Monomers," RadTech Report, Volume 13, Issue 2, Pages 28-32, (1999), discloses that thermal peroxide initiators with amine accelerators in an acrylic system with photoinitiators produce enough of a thermal effect after brief exposure to surface UV irradiation that complete cure can occur even in areas that are not in the line-of-sight of the UV light. The secondary cure is stated as being non-directional.

U.S. Pat. No. 6,245,827 discloses a liquid resin product that exhibits good through cure via a similar dual cure mechanism in a system using cycloaliphatic epoxides, caprolactones, a cationic photoinitiator and an "accelerator" consisting of a free-radical type alpha-hydroxy-ketone photoinitiator and organic peroxide thermal free-radical generators. It is believed that the alpha-hydroxy-ketone reduces the salt fragment of the disintegrated cationic photoinitiator to generate the heat of reaction required to decompose the organic peroxide.

U.S. Pat. No. 7,214,725 describes the curing of a series of acrylate materials that can also participate in Michael addition reactions. While the presence of photoinitiator during UV exposure is not eliminated, significantly lower photoinitiator levels are required.

In order to lower the photoinitiator content in an ink and still get good cure, oxygen must be reduced or excluded to avoid oxygen inhibition. Oxygen inhibition is caused by oxygen acting as a bi-radical, which can easily react with the formed radicals of a photoinitiator, or radicals on the monomer or growing polymer chain, and render them inactive, leading to insufficient curing in the ink.

Several measures have been proposed to minimize oxygen inhibition, for example, inerting a UV dryer with nitrogen or carbon dioxide. However, this requires a sophisticated press-side installation to reduce the oxygen content at the point of cure, and is especially difficult to install for sheet-fed presses.

US 20190389236 discloses a wet-trapping method of preparing a printed article, comprising: applying to a substrate one or more energy-curable ink or coating layers (A) containing one or more photoinitiators; applying to the substrate one or more energy-curable ink or coating layers (B) containing no photoinitiators; and curing all coating and/or ink layers simultaneously at the end of the print run. Less overall photoinitiator is used because layers containing little or no photoinitiator are still capable of curing, presumably due to radical initiating or propagating species required for cure being supplied by diffusion from layers with a more complete level of photoinitiators. The overall process of this method is likely aided by protection of the radiation curable inks from oxygen, i.e., from the bottom by a sealed coating, and from the top by a topcoat. Full curing can be obtained with only ⅓ to ⅛ of the typical initial photoinitiator concentration used in similar, more traditional prepared UV cured laminates.

US 20190389236 was the first disclosure that an EC ink layer, could be cured by a UV initiated free radical process without containing a photoinitiator, if a neighboring layer is itself UV curable containing both UV curable monomers, e.g., radically cured monomers, and a photoinitiator to start the radical reaction. In such a configuration, both layers can cure with a single exposure to UV light. The advantages of this discovery are numerous. For example, in addition to reducing or eliminating the photoinitiator from a portion of the UV curable layers, itself a considerable improvement, the number of UV lamps required for a multi-color print job may also be reduced from one lamp per coating/printing station for each layer (often equal to or even greater than eight) because not every layer will need its own lamp for curing. The present invention improves upon this disclosure with the discovery that an EC ink layer without a photoinitiator can still be cured if it is in the proximity of a non-curable ink or coating layer that contains a UV absorber but no radically reactive monomers that could produce radical propagating species.

BRIEF SUMMARY OF THE INVENTION

The present invention provides further improvements in efficiency and cost-effectiveness in printing multiple layers of inks and/or coatings on a substrate.

It has been found that photoinitiator needed to cure the EC inks or coatings in a multi-layer construct need not be incorporated into an energy curable layer. Rather, the photoinitiator can still initiate curing of EC layers of a multi-layer system when incorporated into a photochemically inert layer, such as an overcoat or primer, wherein a photo-initiated reaction occurs generating radical initiating or propagating species that could diffuse into a photoinitiator free EC layer.

In a particular aspect, the present invention provides a method for applying a layered construct of inks and/or coatings on a substrate, comprising:
a) providing a substrate;
b) providing one or more energy-curable compositions (A), comprising
  i) a colorant,
  ii) one or more energy curable polymers, monomers and/or oligomers comprising reactive functional groups capable of polymerizing or crosslinking under actinic radiation; and
  iii) 0 wt % to 12 wt % one or more photoinitiators, based on the total weight of composition (A);
c) providing a non energy-curable composition (B), comprising
  i) resins that do not comprise reactive functional groups capable of polymerizing or crosslinking under actinic radiation, and
  ii) 1 wt % to 20 wt % one or more photoinitiators, based on the total weight of composition (B); and
d) applying the compositions on the substrate, wherein one or more compositions (A) are applied, and composition (B) is applied as a last down layer on top of the one or more layers of compositions (A);
e) drying the layers of composition (B); and
f) actinically curing simultaneously all of the layers of composition (A) to create a cured ink construct;
wherein the layers of composition (B) can be dried either before or after actinically curing simultaneously all of the layers of composition (A), and wherein the cured print construct passes an initial IPA rub test and passes an initial or 20-hour post-cure thumb-twist test.

In another particular aspect, the present invention provides a method for applying a layered construct of inks and/or coatings on a substrate, comprising:
a) providing a substrate;
b) providing one or more energy-curable compositions (A), comprising
  i. a colorant,
  ii. one or more energy curable polymers, monomers and/or oligomers comprising reactive functional groups capable of polymerizing or crosslinking under actinic radiation; and
  iii. 0 wt % to 12 wt % one or more photoinitiators, based on the total weight of composition (A);
c) providing a non energy-curable composition (B), comprising
  i. resins that do not comprise reactive functional groups capable of polymerizing or crosslinking under actinic radiation, and
  ii. 1 wt % to 20 wt % one or more photoinitiators, based on the total weight of composition (B); and
d) applying the compositions on the substrate, by first applying one or more layers of composition (B) followed by applying the one or more layers of compositions (A) over the first applied layer or layers of composition (B);
e) drying the layers of composition (B); and
f) actinically curing simultaneously all of the layers of composition (A) to create a cured ink construct;
wherein the layers of composition (B) can be dried either before or after actinically curing simultaneously all of the layers of composition (A), and wherein the cured print construct passes an initial IPA rub test and passes an initial or 20-hour post-cure thumb-twist test.

The present invention is a highly flexible method, wherein a non-reactive layer, e.g., a barrier layer or primer, can contain most or all of the photoinitiator needed to cure underlying or overlying energy curable inks. The present invention not only allows one to use less photoinitiators than typically used, simultaneous curing of all the photocurable layers at once reduces the amount of time and energy needed to complete the printing process. It also reduces the number of lamps and curing stations, for example, in some embodiments only a single lamp is required.

These and other objects, advantages, and features of the invention will become apparent to those persons skilled in the art upon reading the details of the formulations and methods as more fully described below.

BRIEF DESCRIPTION OF THE DRAWINGS

FIG. 7 is a schematic representation of a "Top Down" print configuration, yellow over magenta trap.

DETAILED DESCRIPTION OF THE INVENTION

Figure 1:
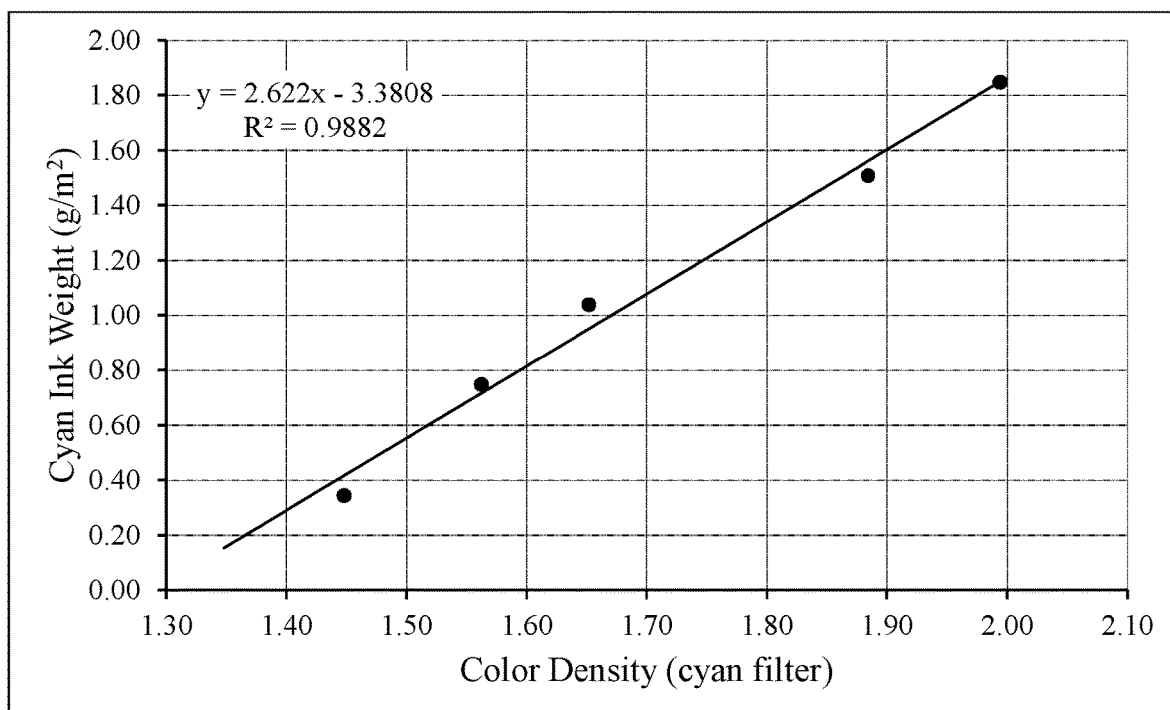
FIG. 1 is a graph showing g/m² of ink vs measured color density of cyan ink.

In one embodiment, the present invention provides an improved method for curing multi-layer constructs of EC inks and coatings with actinic radiation, wherein one or more layers of energy curable (EC) inks and/or coatings comprising materials that can be crosslinked or polymerized by exposure to actinic radiation, e.g., monomers, oligomers or polymers, but which EC inks and/or coatings contain little or no photoinitiators are applied to a substrate; applying over the top of the layers of energy curable inks and/or coatings one or more layers of non-EC inks and/or coatings, comprising one or more photoinitiators but no readily polymerizable components; and, in any order, exposing the printed construct to actinic radiation, simultaneously curing all of the layers of EC inks and/or coatings, and drying the one or more non-EC ink and/or coating layers. This configuration results in a "top-down" cure. Often, it is more convenient to dry the non-energy curable ink and/or coating layers prior to curing the energy curable inks and/or coatings, but this is not required in all embodiments.

In another embodiment, one or more layers of non-EC inks and/or coatings, comprising one or more photoinitiators but no readily polymerizable components are applied to the substrate first, and the one or more layers of energy curable (EC) inks and/or coatings comprising materials that can be crosslinked or polymerized by exposure to actinic radiation, but which contain little or no photoinitiators are then applied on top of the one or more layers of non-EC inks and/or coatings comprising one or more photoinitiators but no readily polymerizable components already applied to the substrate. This configuration results in a "bottom-up" cure. In some embodiments one or more layers of a non-EC ink or coating are then applied over the top of the layers of energy curable inks and/or coatings as an overcoat. In some embodiments the overcoat will comprise photoinitiators, but in many embodiments there is no photoinitiator in the overcoat. As before, in any order, the printing construct is exposed actinic radiation, simultaneously curing all of the layers of EC inks and/or coatings, and the one or more non-EC ink and/or coating layers are dried.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "substrate" means any surface or object to which an ink or coating can be applied. Substrates include, but are not limited to, paper, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein "article" or "articles" means a substrate or product of manufacture. Examples of articles include, but are not limited to: substrates such as paper, fabric, leather, textiles, felt, concrete, masonry, stone, plastic, plastic or polymer film, glass, ceramic, metal, wood, composites, and the like; and products of manufacture such as publications (e.g. brochures), labels, and packaging materials (e.g. cardboard sheet or corrugated board), containers (e.g. bottles, cans), clothing, a polyolefin (e.g. polyethylene or polypropylene), a polyester (e.g. polyethylene terephthalate), a metalized foil (e.g. laminated aluminum foil), metalized polyester, a metal container, and the like.

As used herein, the terms "inks and/or coatings," "inks and coatings," "inks or coatings," "inks," and "coatings" are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

In the present disclosure, a polymerizable or crosslinkable material is referred to as a "polymer, monomer and/or oligomer" containing one or more functional groups that will take part in the polymerization or crosslinking processes of the cure. Mixtures containing "monomers, oligomers and polymers" are often referred to in the art due to the history of polymer chemistry. A molecule that reacts to form a repeating unit is monomer. When a small number of monomers have become linked, they form an oligomer. Oligomers can further react, in the same manner as monomers will, to form repeating units of a larger polymer. Polymers with reactive functional groups can also react in the same manner as monomers and oligomers. The "polymer, monomer and/or oligomer" language is ingrained in the art and offers a way of subjectively referring to a polymerizable or crosslinkable material in a manner that can provide some guidance regarding the size of the compound in question.

In the present disclosure, "oligomer" refers to a polymerizable or crosslinkable material, comprised of repeating units derived from polymerizable or crosslinkable material, having an arbitrarily chosen weight number average molecular weight of about 3,000 Daltons or less and "polymer" comprises such repeating units and has a weight number average molecular weight of about 3,000 Daltons or more. A "monomer" is a polymerizable or crosslinkable material that is a single unit capable of forming a repeating unit in an oligomer or a polymer.

As used herein, "coated paper" or "coated paper substrate" means a paper that has been finished with a clay coat or similar smooth surface for printing by the paper manufacturer.

As used herein, "uncoated paper" or "uncoated paper substrate" means a paper that has been left open by the paper manufacturer so that printing occurs directly on the paper fibers.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended. It is to be understood that wherein a numerical range is recited, it includes the end points, all values within that range, and all narrower ranges within that range, whether specifically recited or not.

Compositions and Methods

In a particular aspect, the present invention provides a method for preparing a layered print construct of inks and/or coatings on a substrate, the method comprising:
 a) providing a substrate;
 b) providing one or more energy-curable compositions (A), comprising
  i) a colorant,
  ii) one or more energy curable polymers, monomers and/or oligomers comprising reactive functional groups capable of polymerizing or crosslinking under actinic radiation; and
  iii) 0 wt % to 12 wt % one or more photoinitiators, based on the total weight of composition (A);
 c) providing a non energy-curable composition (B), comprising
  i) resins that do not comprise reactive functional groups capable of polymerizing or crosslinking under actinic radiation, and
  ii) 1 wt % to 20 wt % one or more photoinitiators, e.g. 3-15 wt % photoinitiators based on the total weight of composition (B); and
 d) applying the compositions on the substrate, wherein one or more compositions (A) are applied, and composition (B) is applied as a last down layer on top of the one or more layers of compositions (A);
 e) drying the layers of compositions (B); and
 f) actinically curing simultaneously all of the layers of compositions (A), to create a cured print construct;
wherein the cured print construct passes an initial IPA rub test and passes an initial or 20-hour post-cure thumb-twist test.

In another particular aspect, the present invention provides a method for preparing a layered print construct of inks and/or coatings on a substrate, the method comprising:
 a) providing a substrate;
 b) providing one or more energy-curable compositions (A), comprising
  i) a colorant,
  ii) one or more energy curable polymers, monomers and/or oligomers comprising reactive functional groups capable of polymerizing or crosslinking under actinic radiation; and
  iii) 0 wt % to 12 wt % one or more photoinitiators, based on the total weight of composition (A);
 c) providing a non energy-curable composition (B), comprising
  i) resins that do not comprise reactive functional groups capable of polymerizing or crosslinking under actinic radiation, and
  ii) 1 wt % to 20 wt % one or more photoinitiators, e.g. 3-15 wt % photoinitiators based on the total weight of composition (B); and
 d) applying the compositions on the substrate by first applying one or more layers of composition (B) followed by applying the one or more layers of compositions (A) over the layer or layers of composition (B);
 e) drying the layers of compositions (B); and
 f) actinically curing simultaneously all of the layers of compositions (A), to create a cured print construct;
wherein the cured print construct passes an initial IPA rub test and passes an initial or 20-hour post-cure thumb-twist test.

In many embodiments, the reactive functional groups of the one or more energy curable polymers, monomers and/or oligomers of composition (A) comprise free radical polymerizable end groups, for example, acrylates, methacrylates, acrylamides, vinyl ethers, allyl ethers, maleates, itaconates, epoxides, and/or oxetanes. For example, the reactive functional groups comprise acrylates.

In some embodiments, the energy-curable polymers, monomers and/or oligomers further comprise hydroxyl, carboxyl, amino groups and/or their associated salts.

In many embodiments, two or more layers of composition (A) are applied to the substrate, for example, four or more layers of composition (A) are applied to the substrate.

For example, in many embodiments, each layer of composition (A) is independently selected from:
 a) a yellow process ink layer, comprising 0 wt % to 3 wt %, e.g., 0.1-3 wt % photoinitiator, based on the total weight of the composition;
 b) a magenta process ink layer, comprising 0 wt % to 3 wt %, e.g., 0.1-3 wt % photoinitiator, based on the total weight of the composition;
 c) a cyan process ink layer, comprising 0 wt % to 5 wt %, e.g., 0.5-5 wt % photoinitiator, based on the total weight of the composition; or
 d) a black process ink layer, comprising 6 wt % to 12 wt %, e.g., 8-12 wt %, based on the total weight of the composition.

In particular embodiments, the inks or coatings of composition (A) comprise small amounts of photoinitiators in the following amounts:
 yellow process inks—0.1-2% or 0.1-0.5%
 magenta process inks—0.1-2% or 0.1-0.5%
 cyan process inks—0.5-3% or 1-2%
 black process inks—6-12%, or 7-10%, or 7-8%.

Often, at least one layer of composition (A) is a black process ink layer. As is well known in the art, black pigments tend to cause difficulties in UV curing of inks and often require a greater amount of photoinitiators and extra time for curing compared with other colors.

According to the present method, the layers of composition (A) are actinically cured simultaneously by light from a high-voltage mercury bulb, medium-voltage mercury bulb, xenon bulb, carbon arc lamp, metal halide bulb, UV-LED lamp, UV laser and combinations thereof, e.g., the layers are curable in a single pass under a medium pressure mercury vapor UV lamp at a speed of 40 meters/minute with a lamp power of 80 Watts/cm.

Also provided is a cured ink construct (i.e. print construct) prepared by the method of the invention, for example, a substrate comprising a cured ink construct of the invention, and articles comprising such coated substrates, e.g., an article that is an electronic article or component.

Any of the inks and coatings of the invention can be applied via a wide variety of printing methods, such as, lithography, flexography, letterpress, gravure, digital, screen, curtain coater, slide coater, drop die, spray bar, ink jet, blanket coater etc. Combinations of printing methods may also be used.

In one embodiment of the invention, the non-EC inks and coatings are applied by a process selected from the group consisting of curtain coater, slide coater, drop die, spray bar, ink jet, blanket coater and combinations thereof. In one embodiment, the non-EC ink and coating layers comprise an extruded polymer layer or ink-jetted polymer layer.

EC layers of the invention can be cured by an actinic light source, such as, for example UV-light, provided by a high-voltage mercury bulb, a medium-voltage mercury bulb, a xenon bulb, a carbon arc lamp, a metal halide bulb, a UV-LED lamp, UV laser, semiconductor laser, excimer laser, or sunlight. In some embodiments, the wavelength of the applied irradiation is within a range of about 200 to 500 nm, such as about 250 to 350 nm. In some embodiments, UV energy is within a range of about 30 to 3,000 $mJ/cm^2$, such as a range of about 50 to 500 $mJ/cm^2$. In addition, the bulb can be appropriately selected according to the absorption spectrum of the EC composition. Moreover, the inks can be cured under inert conditions or as an ink laminated by a plastic foil.

In some embodiments, one or more pre-printing steps are carried out before the method of the present invention is performed. The substrate may be pre-printed with one or more layers of an ink, coating primer, etc. The pre-print layers are then fully dried or cured. This pre-printed substrate subsequently acts as the substrate for the printing method of the present invention.

In many embodiments, the layers of EC inks or coatings, which either do not contain photoinitiators or contain low amounts of photoinitiator, are wet trapped, e.g., overcoated before cure, with a non-EC ink or coating that contains photoinitiators, and then the EC inks or coatings are cured. The resultant printed article exhibits properties equal to or better than traditional EC inks with high levels of photoinitiators. This reduction in photoinitiators is of great value in reducing the need for interstation curing, reduces the need for multiple curing lamps, as well as reducing the amount of photoinitiator, which can cause migration issues in sensitive packaging. The present method may also provide improvements in hardness, scratch/rub resistance, and solvent resistance.

An advantage for the technology of the invention vs conventional UV printing is that when inks are wet trapped under a coating that contains photoinitiator, both in situations where there is additional photoinitiator in the ink and situations where it is not required, only one set of lamps is required to cure the entire composite. This results in major energy use reduction relative to conventional printing. On a press with 100 cm long bulbs with the typical double lamp set for each print station at a typical energy consumption for Hg vapor lamps of 160 W/cm, the electricity reduction will be 32 kW per lamp set that can be turned off. On a simple 4 color job with a UV coating, 5 lamp sets are typically in operation. If all but the lamp set on the coater can be turned off, the reduction would be 128 kW. The more colors that are being printed, the more lamps can be turned off, and the greater the energy savings will be.

In a preferred embodiment of the present invention, a simultaneous drying/curing capability will be inserted behind the coating unit of the press. On offset sheetfed presses this section is known as the "delivery". It is within the capabilities of the maintenance shop of sophisticated printers and is certainly within the capability of press manufacturers. The requirements for web printers (offset, flexographic, etc.) are somewhat more complex, but the installation of additional in-line process units to accomplish thermal drying or UV curing is standard operating procedure for such printing houses and should not present much of an obstacle.

A wide variety of substrates may be coated in the invention. In some embodiments, the substrate is a porous substrate, such as, but not limited to, paper or paperboard that is non-woven or woven in the form of a flat sheet or web. In some embodiments, the paper is clay coated cartonboard such as solid bleached sulphate (SBS) paperboard, poly-coated papers, and high grade super-calendered printing stock. The porosity of the porous substrate may be measured (print side up) using the high-pressure Gurley test, 10 cc of air, 1.0 sq. inch orifice. In a preferred embodiment, the porous substrate has an average Gurley test value of equal to or greater than 130 second. More specifically, for a 15 sample population taken from the intended substrate, the lower 95% confidence limit of the test (mean value−2× standard deviation) preferably exceeds 115. Porosity measurements herein were obtained using a Gurley Automatic Densometer Model 4340, from the Gurley Precision Instrument Company, using standard methods such as TAPPI T 460 om-02.

In other embodiments, the porous substrate may be wetted to temporarily reduce porosity. The wetting liquid may be water or another solvent. In some embodiments, the wetting may be on the back side of the porous substrate. The wetting may be by lithographic press printing, flexographic/gravure press printing or other printing method. In some embodiments, the porous substrate is sealed prior to printing, such as by a primer.

In some embodiments, the substrate is a non-porous substrate, such as, but not limited to, polymer film or a metal foil in the form of a flat sheet or web. Examples include various plastics, glass, metals, and/or coated papers. These may include, but are not limited to, molded plastic parts as well as flat sheets or rolls of polymer films. Common types of polymer films include, but are not limited to, films used in packaging applications. Examples of films used in packaging applications include, but are not limited to, polyethylene terephthalate (PET), polypropylene (PP), polyethylene (PE), polylactic acid (PLA), and/or polystyrene (PS). In some embodiments, polyethylene-based films are mono-layer films or multi-layer films including barrier polymer layers. Films may have coatings (or skin layers) to provide various functional and appearance properties. These include, but are not limited to, metallization, barrier coatings, heat sealing layers, and/or print receptive primers. Films may also contain pigments, fillers, and/or air voids to add color and/or opacity. Films may include heat shrink films used to produce shrink labels including sleeve labels. Metal substrates include, but are not limited to, aluminum foil. Multilayer laminated substrates may also be used. Examples of multi-layer laminated substrates may include, but are not limited to, PET/PE, PET/Al foil/PE, PE/paper, and/or paper/PE/Al foil/PE. The printed plastic film, paper or paperboard may subsequently be laminated to one or more plastic film, to form a printed laminate film.

In some embodiments, the substrates are used in the production of printed packaging. The different types of packaging include flexible packaging, labels, folding cartons, rigid plastic containers, glass containers, and/or metal cans. Rigid plastic containers include bottles, jars, tubs and tubes. The printed packaged containers may contain food products, non-food products, pharmaceutical, and/or personal care items.

The polymerizable materials in the EC inks or coatings contain reactive groups which react with each other or with crosslinkers on exposure to energy-rich radiation. They may be cured using ultraviolet light (UV), specifically by means of photo polymerization driven free radicals that are produced when photoinitiator is exposed to UV light. A variety of actinic light sources can be used, such as UV-light, provided by a high-voltage mercury bulb, a medium-voltage mercury bulb, a xenon bulb, a carbon arc lamp, a metal halide bulb, a UV-LED lamp, a UV laser, such as a semiconductor laser or an excimer laser, or sunlight.

The EC inks comprising polymerizable or cross-linkable materials may be printed on some, most, or all of the substrate. Typically, the non-EC ink or coating is applied over the top of all EC ink printed areas, and in many embodiments is applied as a flood coat, covering the entire construct beneath, including all printed and unprinted areas. In some embodiments, non-EC ink or coating is applied to the substrate, e.g., as a primer, and the EC ink or coating is applied to the surface of the primer.

The EC inks and coatings of the invention typically comprise vehicle, diluent, which is typically an acrylate oligomer and/or monomer, and additives, and optionally one or more colorants, but no photoinitiator. The diluent controls viscosity and tack.

The EC ink of the invention may comprise dispersible polymerizable and/or crosslinkable material, e.g., monomers, oligomers, and/or polymers, which comprise reactive functional, groups including, but not limited to, acrylates, methacrylates, acrylamides, vinyl ethers, allyl ethers, maleates, itaconates, epoxies, and/or oxetanes. In some embodiments, the reactive groups are free radical polymerizable end groups. In some embodiments, the free-radical curable groups are acrylate groups. In some embodiments, there are other functional groups on the acrylate monomers or oligomers, such as, but not limited to hydroxyl, carboxyl, amino groups and/or their associated salts. In some embodiments, the EC ink comprises polyester acrylates, urethane acrylates, epoxy acrylates and combinations thereof.

Typically, the EC ink comprises about 0% to about 15% photoinitiator by weight. In the present invention, the non-reactive, photoinitiator containing coating has an amount of photoinitiator that would be sufficient to cure the EC ink beneath it. The EC inks and non-EC coating composites of the present invention are cured by exposure to UV light at commercially available intensities at typical printing press or coater speeds. In some embodiments, the EC inks contain about 0-12% photoinitiator, e.g., about 0-10%, about 0-8%, about 0-6%, about 0-5%, about 0-4%, about 0-2%, about 0-0.5%, about 0-0.3%, about 0.5-10%, about 0.5-8%, about 0.5-6%, about 0.5-5%, about 0.5-4%, about 0.5-2%, about 0.5-1%, or about 0.1-0.5%, with the photoinitiator content dependent on the color of the ink being cured. The non-reactive coating preferably contains about 2-15%, such as about, 3-12%, about 3.5-13%, or about 4.5%-10.0% photoinitiator.

In some embodiments, layers of photoinitiator-free EC inks are cured after being coated with non-reactive coatings containing about 2-10% photoinitiator. In some embodiments, the non-reactive coating contains about 5-10%, about 6-9% or about 7-8% photoinitiator.

It may be advantageous to add a small amount of photoinitiator to the EC ink. The amount of photoinitiator is dependent on the color of the ink since it is well known that varying amounts of photoinitiator are required to cure different colors. In the case of 4-color process printing inks (yellow, magenta, cyan, black), excellent results were obtained when the amounts of photoinitiator for the individual EC process colors were as follows:

Yellow process inks—0.1-2% or 0.1-0.5%
Magenta process inks—0.1-2% or 0.1-0.5%
Cyan process inks—0.5-3% or 1-2%
Black process inks—6-12%, 7-10% or 7-8%

With black process inks, the addition of 6-12% photoinitiator, more preferably 7% to 10% and most preferably 7% to 8%, will allow the ink to cure without difficulty at commercially relevant UV exposure levels when overprinted with the non-EC coating of the invention. In one example, a black EC ink containing 7.1% photoinitiator under a water-based non-EC acrylic coating containing 7.7% photoinitiator was cured to a commercially acceptable condition at 40 m/minute with lamp intensity of 80 W/cm. The same black ink containing 11.7% photoinitiator (in the ink) and coated with the same water-based coating comprising no photoinitiator did not cure under the conditions, and instead required an exposure of 40 m/minute at 160 W/cm intensity to cure to a commercially acceptable condition.

However, excellent results with curing black ink according to the invention are realized when using a black ink having an optical density >1.8 and comprising 4-12%, 6-10% photoinitiator, and in some embodiments 7-8% photoinitiator. In many embodiments the combined amount of photoinitiator by weight in the black ink and the non-EC coating is less than the amount of photoinitiator that would be required to cure the black ink alone at identical UV exposure levels with no coating over it. Generally, the combined amount of photoinitiator by weight in the black ink and non EC coating of the invention would be incapable of curing the black ink if added to the black ink alone with no coating over it.

In some embodiments, the ink or coatings of the invention independently comprise an oil-modified phenolic resin, a ketone resin, an aldehyde-urea resin, an oil modified polyester resin, a melamine resin, an epoxy resin, a polyurethane resin, an acrylic styrene resin, or mixtures thereof, provided that the resin is soluble in any acrylic monomers, oligomers, oils, and alkyds used in the ink.

The EC inks comprise polymerizable or crosslinkable materials, e.g., polymerizable monomers or oligomers. The monomers or oligomers may be selected from acrylate monomers or acrylate oligomers. In some embodiments, the monomers are selected from acrylate, caprolactone, and pyrrolidone monomers.

Acrylate monomers suitable for the EC inks comprise acrylic monomers having 1-6 acrylate groups. Examples of acrylate monomers include, but are not limited to, 1,2-ethylene glycol diacrylate, 1,4-butandiol diacrylate, 1,6-hexandiol diacrylate, dipropylene glycol diacrylate, neopentylglycol diacrylate, ethoxylated neopentylglycol diacrylates, propoxylated neopentylglycol diacrylates, tripropyl ene glycol diacrylate, bisphenol-A diacrylate, ethoxylated bisphenol-A-diacrylates, bisphenol-A-diglycidylether diacrylate, poly(ethylene)glycol diacrylates, trimethylolpropane triacrylate, trimethylolpropane trimethacrylate, ethoxylated trimethylolpropane triacrylates, propoxylated trimethylolpropane triacrylates, propoxylated glycerol triacrylates, pentaerythritol triacrylate, ethoxylated pentaerythritol triacrylates, propoxylated pentaerythritol tetraacrylates, ethoxylated pentaerythritol tetraacrylates, ditrimethylolpropane tetraacrylate, dipentaerythritol pentaacrylate, dipentaerythritol hexaacrylate, ethoxylated dipentaerythritol hexaacrylates or mixtures thereof.

In some embodiments, the monomers are selected from 1,6-hexandiol diacrylate, 3-methyl 1,5-pentanediol diacrylate, dipropylene glycol diacrylate, propoxylated neopentylglycol diacrylates, tripropylene glycol diacrylate, ethoxylated bisphenol-A-diacrylates, bisphenol-A-diglycidyl ether diacrylate, poly(ethylene)glycol diacrylates, trimethylolpropane triacrylate, ethoxylated trimethylolpropane triacrylates, propoxylated trimethylolpropane triacrylates, propoxylated glycerol triacrylates, propoxylated pentaerythritol tetraacrylates, ethoxylated pentaerythritol tetraacrylates, ditrimethylolpropane tetraacrylate, and combinations thereof.

In some embodiments, the monomers are selected from tripropylene glycol diacrylate, trimethylolpropane triacrylate, ethoxylated trimethylolpropane triacrylates, propoxylated glycerol triacrylates, and ethoxylated pentaerythritol tetraacrylates, propoxylated pentaerythritol tetraacrylates, and combinations thereof.

In some embodiments, the monomers are selected from 3-methyl 1,5-pentanediol diacrylate, tripropylene glycol diacrylate, trimethylolpropane triacrylate, propoxylated glycerol triacrylates, ethoxylated pentaerythritol tetraacrylates, and combinations thereof.

In some embodiments, the monomers are selected from ethoxylated trimethylolpropane triacrylates, propoxylated pentaerythritol tetraacrylates, and combinations thereof.

The EC ink may comprise one or more acrylated oligomers with a weight number average molecular weight of about 400-3,000 Daltons. The weight number average is determined using gel permeation chromatography (GPC). In some embodiments the acrylated oligomers have an acrylate functionality of 2 or more. Examples of acrylated oligomers include, but are not limited to, acrylated oils based on linseed oil, soy oil and castor oil; epoxy acrylates; oil modified polyester acrylates such as Ebecryl 870 (Allnex); acrylated polyurethanes; acrylated polyacrylates; acrylated polyethers; and acrylated amines. The acrylated oligomers may impart rheology, pigment wetting, transfer, gloss, chemical resistance, and other film properties. In some embodiments the acrylated oligomer is acrylated oil or an oil-modified polyester.

In order to avoid premature polymerization of double-bonds in the oils and alkyd resin of EC inks, an antioxidant may be added. Exemplary antioxidants include ascorbic acid, astaxanthin, carotene, chroman (3,4-dihydro-2H-1-benzopyran), hexamethylene bis(3,5-di-tert-butyl-4-hydroxyhydro-cinnamate), octadecyl 3,5-di-tert-butyl-4-hydroxyhydro-cinnamate, vitamin E and vitamin E analogs, eugenol (4-allyl-2-methoxyphenol), butylated hydroxyanisole (BHA), hydroquinone, 4-methoxy phenol, mono-tert-butylhydroquinone (MTBHQ), other hydroquinone ethers, butylated hydroxy toluene (BHT), Genorad™ inhibitors from Rahn, and FLORSTAB™ stabilizers from Kromachem. In some embodiments, the antioxidants are selected from MTBHQ, BHT, and combinations thereof.

The non-reactive coating of the invention may be water based or solvent based. Typically, it is thermally dried by exposure to air flow and/or heat and/or IR radiation prior to or after the EC ink beneath is exposed to actinic radiation. Generally, the resistance properties (rub and/or solvent and/or scratch resistance) of the finished structures significantly exceed those of the same ink cured without the barrier being present. The non-reactive coating may be applied directly to the substrate or may be printed on some, most, or all of the substrate and/or ink, typically by a non-contact method, including, but not limited to, curtain coater, slide coater, drop die, spray bar, and ink jet. In some embodiments, the coating is applied by flexo, gravure, or blanket coating. In some embodiments, the non-reactive coating is at least a partially air impermeable layer.

The water-based coating is more than 50% water by weight, but may comprise additional solvents, such as those typically employed for ink and coating formulations. These include, but are not limited to acetates, alcohols, ketones, glycol ethers, esters, aliphatic and aromatic hydrocarbons or other petroleum distillates, or blends thereof.

The solvent-based coatings contain more than 50% solvents. Typical solvent used in solvent-based coatings include alcohols such as ethanol, n-propanol, isopropanol, n-butanol, sec-butanol, isobutanol and tert-butanol; glycols; ketones such as acetone, methyl ethyl ketone and methyl isobutyl ketone. Additional typical solvents used in solvent-base coatings include esters such as ethyl acetate, n-propyl acetate, isopropyl acetate, n-butyl acetate, sec-butyl acetate, tert-butyl acetate and isobutyl acetate. Further solvents typically used in solvent-base coatings include hydrocarbons, some of the more common of which include n-heptane, toluene, ethyl benzene, cyclohexane, and cycloheptane. Less commonly used in solvent-base coatings are some of the less volatile ethers such as 1,4-dioxane, dioxolane, 2-butoxyethanol, dipropylene glycol methyl ether, propylene glycol methyl ether, propylene glycol methyl ether acetate, etc.

There is no particular limitation to the polymers and resins that are used in the non-reactive inks and coatings and include those known to one skilled in the art.

In some embodiments, the non-reactive binder polymer or polymers are acrylic polymers, often acrylic copolymers of at least two alkyl ester acrylates, such as methyl methacrylate/butyl acrylate copolymer and the like. Any water-compatible or water-soluble acrylic polymer can be employed, such as for example, acrylic homo-polymers and co-polymers, e.g., styrene acrylic emulsions, acrylic amide copolymers and co-polymers and/or acrylic colloidal dispersions. In some embodiments the compositions employ an excess of amine for acrylic based compositions to maintain solubility, or alternately may use starches or their derivatives as revealed in EP2356184B1, which is hereby incorporated by reference.

Among the more commonly used resins are alkaline and stabilized acrylic and polyurethane dispersions wherein the particles do not agglomerate and/or settle out of the water. This is typically accomplished, for example, by neutralizing dispersed polymer acid moieties, such as pendant carboxylic acid moieties, with a basic compound such as ammonia or an amine. Useful amines include aliphatic, cycloaliphatic, aromatic, or heterocyclic amines having one or more primary, secondary or tertiary amino groups that are water soluble. Especially preferred are alkoxyamines. Examples include but are not limited to ammonia (aq.), ethanolamine (mono, di, tri), propanolamine, isopropanolamine, urea, 2-(dimethylamino)ethanol, 2-amino-2-methyl-1-propanol and similar materials.

As used herein, a "water-based acrylic" (or "water-based polyurethane") is an acrylic (or polyurethane) that is water soluble or dispersible, and compatible with a waterborne ink or coating composition. Other resins can also be present such as polyesters, styrene-maleic anhydride resins and half esters, styrene-butadiene latexes, polyvinylalcohols, SBR latexes, vinyl acetate emulsions and other water compatible polymers. The resins can vary in molecular weight and can include surface tension modifiers.

In some embodiments, optional additives are added to the ink or coating to impart various properties, such as, but not limited to, surface tension modifiers, defoamers, preservatives, biocides, dispersants, thickeners, and crosslinking agents. In some embodiments, plasticizers and/or coalescing agents are used to modify the properties of the resins as well as to aid in film-forming during the drying process. Adjustment of surface characteristics of the dried coating can be made with waxes such as, but not limited to, amide wax, erucamide wax, polypropylene wax, paraffin wax, polyethylene wax, polytetrafluoroethylene (PTFE), carnauba wax, and the like or their combinations. Wax, if present, is typically in an amount of up to about 4 wt. %. Any of the known additives typically employed in inks and coatings can be used in the formulation of the relevant water-based coatings.

There is no particular limitation to the resins that are used in non-reactive inks and coatings and include those known to one skilled in the art. Some are of natural origin and some are synthetic polymers. Among the more commonly used are polyurethane, nitrocellulose, polyvinyl butyrate, ethylene vinyl acetate, polyamide, polyvinyl chloride, polystyrene, styrene maleic anhydride, acrylic resins, styrene allyl alcohol, polyester, epoxy, hydrocarbon, cellulose, polyamide, rosin, modified resins and combinations thereof.

Resins for non-reactive inks or coatings include, but are not limited to, Tego Variplus AP (Evonik), the Laropal A aldehyde resin series from BASF (e.g. A-81, A-101, etc.), and ketone resin (e.g. Tego AP ketone-aldehyde condensation resin).

Examples of photoinitiators, include, but are not limited to benzophenones, benzilketales, dialkoxy acetophenones, hydroxyalkyl-acetophenones, aminoalkylphenones, acylphosphinoxides and thioxanthones, for example benzophenone, methylbenzophenone, 4-phenylbenzophenone, 4,4'-bis(dimethylamino)-benzophenone, 4,4'-bis(diethylamino)-benzophenone, 2,2-dimethoxy-2-phenylacetophenone, dimethoxyacetophenone, diethoxy-acetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl(2,4,6-trimethylbenzoyl) phosphinoxide, 2,4,6-trimethylbenzoylethoxyphenyl phosphinoxide, 2-isopropylthioxanthone, 4-isopropylthioxanthone, 2,4-dimethylthioxanthone 2-hydroxy-1-{4-[4-(2-hydroxy-2-methyl-propionyl)-benzyl]-phenyl}-2-methylpropan-1-one, or mixtures thereof.

In some embodiments, the photoinitiator is selected from Type I photoinitiators. A non-limiting list of examples includes: 2-benzyl-2-dimethylamino-1-(4-morpholinophenyl)-butan-1-one, bis-acyl phosphine oxide (Irgacure 819), 2,4,6-Trimethylbenzoyldiphenylphosphine, ethyl phenyl (2,4,6-trimethylbenzoyl) phosphinate, 50/50 blend of Darocur 1173 and 2,4,6-Trimethylbenzoyldiphenylphosphine, 2-methyl-1-[4(methoxythio)-phenyl]-2-morpholinopropan-2-one.

In some embodiments, the photoinitiator is selected from Type II photoinitiators, such as for example isopropylthioxanthone, 2,4-Diethylthioxanthone, ethyl Michler's ketone, and polymeric Type IIs; and combinations thereof.

In some embodiments, the photoinitiator is selected from 2-benzyl-2-dimethylamino-1-(4-morpholinophenyl)-butan-1-one, bis-acyl phosphine oxide (Irgacure 819), 2,4,6-Trimethylbenzoyldiphenylphosphine, ethyl phenyl (2,4,6-trimethylbenzoyl) phosphinate, 50/50 blend of Darocur 1173 and 2,4,6-Trimethylbenzoyldiphenylphosphine, 2-methyl-1-[4(methoxythio)-phenyl]-2-morpholinopropan-2-one, and combinations thereof.

In some embodiments, the photoinitiator is selected from bis-acyl phosphine oxide (Irgacure 819), 2,4,6-Trimethylbenzoyldiphenylphosphine, ethyl phenyl (2,4,6-trimethylbenzoyl) phosphinate, Irgacure 754; 211510-16-6; benzeneacetic acid, a-oxo-,1,1'-(oxydi-2,1-ethanediyl) ester, and methyl benzoyl formate, and combinations thereof.

In some embodiments, the photoinitiator is selected from bis-acyl phosphine oxide (Irgacure 819), 2,4,6-Trimethylbenzoyldiphenylphosphine, ethyl phenyl (2,4,6-trimethylbenzoyl) phosphinate, and combinations thereof.

An ink designed for food packaging generally contains lower amounts of low molecular weight monomeric photoinitiators because they can migrate from the ink to the food. In some embodiments, the formulations do not contain low molecular weight monomeric photoinitiators. Instead they contain oligomeric or polymeric photoinitiators. In some embodiments, oligomeric or polymeric photoinitiators include, but are not limited to, photoinitiators containing oligomeric benzophenone derivatives such as Omnipol BP from IGM resins, oligomeric amines such as Genopol AB-1 from Rahn Group, and oligomeric type-I-photo initiators such as Omnipol 910 from the IGM company; and the like.

An amine synergist may also be included in the EC ink formulation. Suitable examples include, but are not limited to aromatic amines, such as, but not limited to, 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino) benzoic acid, with ethyl, amyl, 2-butoxyethyl and 2-ethylhexyl esters being particularly preferred; other positional isomers of N,N-dimethylamino)benzoic acid esters and the like are also suitable.

Aliphatic amines such as N-methyldiethanolamine, triethanolamine and tri-isopropanolamine are also suitable amine synergists.

Commercially available amine synergists include aminoacrylates and amine modified polyether acrylates, including, but not limited to, EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 ex DSM-AGI.

In some embodiments, colorants in the form of pigments and/or dyes may be incorporated into the EC ink or non-EC ink. In many embodiments, one or more of the EC inks comprise a colorant. Pigments may be in a dry powder form, which can then be milled along with a portion of the vehicle or monomers or resins using technology which is well known in the art. Examples of colorants include, but are not limited to, organic pigments, metallic pigments, effect pigments such as pearlescent pigments, and combinations thereof.

The one or more colorants may be in the form of a dye or pigment. Pigments suitable for use include, but are not limited to, conventional organic or inorganic pigments. Representative pigments include, but are not limited to, the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48:2, Pigment Red 53:1, Pigment Red 57:1, Pigment Red 81:1, Pigment Red 112, Pigment Red 122, Pigment Red 170, Pigment Red 184, Pigment Red 210, Pigment Red 238, Pigment Red 266, Pigment Blue 15, Pigment Blue 15:1, Pigment Blue 15:2, Pigment Blue 15:3, Pigment Blue 15:4, Pigment Blue 61, Pigment Green 7, Pigment Green 36, Pigment Violet 1, Pigment Violet 19, Pigment Violet 23, Pigment Black 7, and combinations thereof.

In some embodiments, the EC ink or the non-EC ink comprises an inert hard resin that is compatible and/or soluble with acrylate monomers and oligomers, oils and alkyd resins. An inert hard resin is a natural or synthetic, amorphous material, which forms a tack-free film at room temperature after application to a substrate. These materials do not have reactive functional groups and not capable of crosslinking by energy cure. Examples of inert hard resins include, but are not limited to, rosin resin derivatives, which consist of a variety of isomers and different chemical structures, such as derivatives of abietic acid, levopimaric acid, neoabietic acid, palustric acid, dehydroabietic acid, pimaric acid and isopimaric acid. The rosin derivative can be modified with maleic anhydride or fumaric acid and esterified with polyols such as glycerol and pentaerythritol, or a phenolic rosin resin.

In some embodiments, the ink or coatings of the invention independently comprise a maleic rosin resin which is soluble in acrylic monomers. Examples of a maleic rosin resin include, but are not limited to, Jonrez IM 816, Jonrez IM 817, Jonrez IM 824, Jonrez IM 833 (all from Westvaco), Arez RE 3010 (AREZ International), Resinall's 440 and 445, Filtrez 3300 (AKZO). In some embodiments, the resin has a softening point >100° C., a cloud point >100° C. in 10% 6/9 mineral test oil from Haltermann Carless, and an acid value of 10-40 mg KOH/g.

In some embodiments, the ink or coatings of the invention independently comprise an acrylate soluble hydrocarbon resin or modified hydrocarbon resin. Examples of acrylate soluble hydrocarbon resins or modified hydrocarbon resins include, but are not limited to aromatic C-9 hydrocarbon resins having a softening point of >100° C. such as Norsolene S125, S135, S145 (from Cray Valley) or GA-120, a C-9 aromatic hydrocarbon resin (Luen Liang Industrial, Taiwan) and mixtures thereof.

In some embodiments the EC ink or non-EC ink may further comprise additives to modify flow, surface tension, gloss, pigment wetting, and abrasion resistance of the cured coating or printed ink. Such additives contained in inks or coatings typically are surface-active agents, waxes, shelf-life stabilizers, etc. and combinations thereof. These additives may function as leveling agents, shelf-life stabilizers, wetting agents, slip agents, flow agents, dispersants and de-aerators. Examples of additives include, but are not limited to, fluorocarbon surfactants, silicones and organic polymer surfactants. Examples include the Tego Rad™ product lines (Tego Rad™ are trademarked and are commercially available products of Evonik, Essen Germany) and the Solsperse™ product lines (Solsperse™ are trademarks and are commercially available products of Lubrizol Company).

Other additives ink may also be present e.g., extenders such as clay, talc, calcium carbonate, magnesium carbonate, silica, or combinations thereof, to adjust water pickup, misting, and color strength.

The inks or coatings of the invention can be made by typical procedures known in the art, usually by dry-grinding or using a flush, color concentrate or base.

In a typical dry-grind manufacturing procedure for inks, the required amount of dry pigment is mixed with conventional oils, alkyd resin, inert hard resins and acrylate in a dissolver or mixer for about 15-30 minutes to wet out all pigment. Typically, the inert hard resin is introduced as a solution in either oil or acrylate monomer (varnish). The pre-mix is then ground on a three-roll mill (or other grinding mill) at a pressure of about 1-4 MPa and a temperature of 20-40° C. until the desired grind specifications are met. Photoinitiators can be added before or after grinding in the form of a solution or paste.

In the "flushing process" the wet pigment press cake is "flushed" in high shear grinding equipment like, for example, a sigma blade mixer. Oil, varnish, alkyd, and/or other non-aqueous hydrophobic vehicles are added, and the pigment will eventually flush into the organic phase and leave the water phase clear of pigment. A substantial part of the water can then be poured off. In order to remove the remaining water, usually heat and vacuum is applied. The resulting product is called a "flush paste" or pigment concentrate (base). Then, the pigment concentrate is diluted with acrylate monomer, oligomer, optionally photoinitiator and solution of inert hard resin (varnish).

Where an ink is to be used on food packaging, it is essential, from the point of view of customer acceptance, that it should not contaminate the food or impart any unnatural odor to it. Moreover, there is an increasing tendency for legislation to prescribe very low levels of contaminants in foods and other matter which could affect public health. Contamination, in this context, can result from migration of components of an ink into the foodstuff or other packaged material or from undesirable odors imparted to the packaged material by the ink. The reduction of photoinitiator also reduces the likelihood that the photoinitiator migrates. In addition, improved cure reduces the likelihood that unreacted monomer migrates.

Migration testing is often used to determine the potential for ink components to enter the package and adulterate the packaged product. Migration testing methods often involve the use of food simulants to mimic migration into food products. Electron beam curable inks may give low migration upon curing. In some embodiments, migration levels of ink components may be below about 100 ppb, below about 90 ppb, below about 80 ppb, below about 70 ppb, below about 50 ppb, and/or below about 10 ppb. In some embodiments, migration levels of ink components into the food simulants is below about 50 ppb, such as less than about 10 ppb, which may allow compliance with food and pharmaceutical packaging regulations in many regions of the world including FDA regulations in the US.

EXAMPLES

The invention is further described by the following non-limiting examples which further illustrate the invention, and are not intended, nor should they be interpreted to, limit the scope of the invention. All parts and percentages are by weight (wt % or mass % based on the total weight), unless specified otherwise.

Color density was measured using an X-Rite Spectroeye™ REV D. spectrodensitometer from X-Rite with the appropriate filter. The X-Rite Spectroeye™ REV D. is equipped with both density and CIELAB measurement functions.

Finger Rub Test

Mar resistance was assessed by using a finger rub test. A finger was rubbed back and forth, with force typical of holding and manipulating a printed article, on the top layer of the cured print construct. If the printed layers remain intact, the construct passes the finger rub test. If one or more of the printed layers smears, or is marred, then the construct fails the finger rub test. The primary purpose of the test is to evaluate surface curing.

Thumb-Twist Test

The thumb-twist test was also used to assess marring. A thumb is pressed with force on the top layer of the cured print construct, and turned by 90 degrees. If the printed layers remain intact, the construct passes the thumb-twist test. If there is marring or damage to one or more of the printed layers (typically a failure of the bond between the substrate and the ink/coating), then the construct fails the thumb-twist test. The primary purpose of the test is to evaluate through curing.

Solvent Rub Test

The solvent rub test was used to assess ink and coating adhesion to the substrate. A cotton tipped wooden swab was wetted with isopropanol and rubbed back and forth (i.e. a double rub) on the top layer of the cured construct. The number of double rubs before there was damage to the cured construct is recorded.

The inks used in the Examples below were commercial, photoinitiator-free inks from Sun Chemical: Yellow Ink FLCWB2445033, Magenta ink FLCWB4445037, Cyan ink FLCWB5445039, Black ink (FLCWB9445043). In very general terms they consist of acrylate monomers, acrylate oligomers, inert resins dissolved in the acrylates, colored pigments and additives known to those skilled in the art.

Rycoline 181349 is a water-based unreactive coating, which in general terms consists of acrylic emulsion resins in water and additives known to those skilled in the art, with a total solids level of 37.4%. Rycoline 4232-71-1 is a water-based, unreactive coating comprising 94% Rycoline 181349 and 6% photoinitiator blend containing a 1:1 mixture of TPO-L and IGM 73; i.e. ethyl(2,4,6-trimethylbenzoyl)-phenyl phosphinate and 2-hydroxy-2-methyl-1-phenyl propanone) known generically as HMPP.

In the following Examples, inks were laid down using an offset roller proofing method that is often used in the field and a Quick Peek™ rollout system, available currently from Thwing-Albert Instrument Company and others. A Quick Peek™ proofer has a smooth flat plate, a steel measuring bar, plunger for obtaining an accurate predetermined volume of ink, and a roller assembly. The roller assembly is typically a nitrile PVC blend roller that can be used with conventional, hybrid, and UV inks and is used to distribute the ink on the plate and make a proof. The required amount of ink is placed in the measuring bar with a steel spatula and then pushed out onto the surface of the roller. The ink is then rolled out onto the plate until evenly distributed on entire surface of plate and roller. The inked-up roller is then rolled out on the desired paper stock.

The waterbase coatings, Rycoline 841349 and Rycoline 4232-71-1, were applied using a bladed 2-roll Harper Phantom™ hand-proofer with a roll set consisting of a rubber roller with a durometer hardness of Shore A 45 and a 360 lpi×4.23 bcm anilox roller; pi=lines (of engraving) per inch of width of the roller, bcm=billion cubic microns per square inch of cell volume on the roller. The hand-proofer can be bladed, the blade capable of stripping excess ink from the roller. Use of the blade provides thinner layers, without the blade one gets thicker layers. Such hand-proofers, and methods of their use, are long known in the field.

Ink Densities

Ink densities of the proofs made in the Examples were also measured using the X-Rite Spectroeye™ REV. D spectrodensitometer, (The X-Rite Spectroeye™ REV D. is equipped with both density and CIELAB measurement functions) dry ink, status "T", and were all equal to or greater than commercial standards. Minimum densities were: Black=1.70, Cyan=1.45, Magenta=1.50, and Yellow=1.05.

Example 1: Photoinitiator-Free EC Ink with Unreactive Overcoat Containing Photoinitiator A water-based, unreactive coating comprising photoinitiators was prepared from Sun Chemical's Rycoline 181349, an emulsion of acrylic resins in water containing additives common in the art, with a total solids level of 37.4%, which contains no compounds having functionality that could sustain a crosslinking reaction typical of UV curing. The 181349 was diluted with deionized water, into which a solution of the photoinitiator Irgacure 127 in isopropanol was slowly added with stirring to provide a coating composition comprising 70.4% 181349, 14.7% deionized water, 7.7% Irgacure 127 and 7.2% isopropanol, with a total solids of 34.0%.

Irgacure 127 is a tradename of 2-hydroxy-1-{4-[4-(2-hydroxy-2-methyl-propionyl)-benzyl]-phenyl}-2-methyl-propan-1-one.

A series of commercially available photoinitiator-free EC inks, typically cured by exposure to EB radiation generally found in lithographic printing, comprising colored pigments, acrylate monomers, acrylate oligomers, inert resins dissolved in the acrylates, colored pigments and commonly used additives, were used in the following experiments as photoinitiator-free EC inks.

The following Sun Chemical inks were used:
Example 1A—Yellow (FLCWB2445033)
Example 1B—Magenta (FLCWB4445037)
Example 1C—Cyan (FLCWB5445039)
Example 1D—Black (FLCWB9445043)

The inks, Examples 1A-1D, were printed separately on coated proofing paper, BYK Chart 2810, using an offset roller method, at optical densities typical of or greater than those common in commercial printing. The unreactive water-based coating containing 7.7% Irgacure 127 from above was applied over the wet ink with a 2-roll Harper Phantom™ hand proofer using a 360 lpi×4.23 bcm anilox roller. The coating was dried for 1-2 minutes in ambient conditions (forced air, no heat at 20°-25° C.), then checked in locations where ink was not present beneath the coating to verify that the coating was dry to the touch. After evaporation of the solvent and water, only the 181349 solids and the Irgacure 127 remained on the coated surface with a ratio of resin solids (mostly acrylic) to photoinitiator in the dried coating of 77.3/22.7.

The printed/coated samples were then passed under a medium pressure mercury vapor UV lamp at a speed of 40 meters/minute with a lamp power of 80 Watts/cm. The UV dosages under the conditions were measured as shown in Table 1. The UV energy was measured using a UV Power-Puck II™ radiometer from EIT, where "dose" is the integration of sensor readings from the start to finish of UV exposure; "irradiance" (sometimes referred to as "intensity") is the peak irradiance measured of all the measurement packets gathered operating at 2048 Hz, typically referred to as "smoothing OFF." For an approximately 10 cm footprint of light under the lamp, at 40 m/min any given point will spend: T=10 cm/{(40 m/min)(100 cm/m)(min/60 sec)}=0.15 sec under the lamp, with "smoothing OFF" that is 2048 (0.15)=307 measurement cycles.

TABLE 1

| UV dosages | | |
|---|---|---|
| Light Type | mJ/cm$^2$ | mW/cm$^2$ |
| $UV_A$ | 55.8 | 2813 |
| $UV_B$ | 62.9 | 3292 |
| $UV_C$ | 11.0 | 600 |
| Total UV | 129.7 | |

Control charting of the actual exposures from test to test indicated, with 95% certainty, that the actual exposure for any individual test was +/−20% of the nominal value. For a nominal UV exposure level of 129 mJ/cm$^2$, this calculated to a 95% confidence range of 103-155 mJ/cm$^2$ as the actual exposure level.

The proofs were checked within 1-2 minutes of passing under the UV lamp for whether or not they passed the thumb-twist test (thumb is applied with pressure to the printed substrate and twisted 90°). If the ink broke loose from the substrate or if there was significant visible smearing of the image, the test was considered a failure. Tests such as this are the most common means for determining press-side whether or not a UV ink or coating system has been cured.

The proofs were tested for resistance to alcohol rubs within 4-6 minutes after passing under the UV lamp using a cotton tipped wooden swab and isopropanol. The swab wetted with isopropanol was rubbed in a back-and-forth motion across the printed image until it broke through and the white of the underlying paper started to become visible. Each back-and-forth motion was counted as one "double-rub". Results are shown in Table 2.

TABLE 2

| Examples 1A-1D thumb twist and IPA resistance results | | | |
|---|---|---|---|
| Ink Example | Initial Thumb Twist | Initial avg. IPA double rubs to breakthrough | 20 hr. post-cure avg. IPA double rubs to breakthrough |
| 1A Yellow | Pass | 11-12 | 19-24 |
| 1B Magenta | Fail* | 9-12 | 12-14 |
| 1C Cyan | Pass | 9-10 | — |
| 1D Black | Fail | 4-5 | — |

*20 hours post-exposure, the 1B magenta passed the thumb-twist resistance test

The yellow ink (1A) cured, surprisingly, to commercially acceptable levels in this construction, passing the thumb twist test at 2 minutes and the rub test at 4-6 minutes. The magenta ink (1B) marginally passed the initial IPA rub test and failed the initial thumb twist, but clearly passed both tests after 20-hr. post-cure. Some of the ink/coating composites, e.g., cyan ink (1C) passed the thumb-twist test immediately after UV exposure. The solvent rub resistance for some proofs was also commercially acceptable and increased with time. It should be noted that there is no universally agreed upon definition of commercially acceptable IPA rub resistance, however less than 10 may be considered unacceptable as such levels usually correlate with thumb-twist failure and ink smearing under repeated finger rubs, neither of which is commercially acceptable.

The tests results for Inks 1A, 1B and 1C, each containing no photoinitiator, were completely unexpected. In practical terms, the look and feel of the proof appeared acceptable from a commercial standpoint. Further, yellow (1A), magenta (1B) and cyan (1C) all appeared to be fairly well cured in terms of surface hardness of the ink/coating. An additional unexpected result was that the cure appeared to continue to improve in terms of solvent rub resistance over time. It is generally assumed that UV curing is a relatively 'instantaneous' process with cure taking only a matter of milliseconds.

Only the black ink (1D) failed to cure, and was, expectedly, still soft and smeary. Even though the black did not fully cure in the Example above, addition of small to moderate amounts of photoinitiator to the black ink (1D) in Example 2 below, can remedy this situation, while still maintaining a total amount of photoinitiator content in the final print construct that is considerably lower than needed for conventional UV printing.

Previous work has shown that if UV curing begins in one layer, that cure can be propagated to an adjacent layer containing reactive materials but no photoinitiator (U.S. Pat. No. 4,105,806 and WO 2018/165068). The present results are unexpected because it has never been shown that such cure initiation in the adjacent layer can occur even if there is no ongoing (free radical polymerization) reaction occurring in the layer containing the photoinitiator.

Example 2: EC Inks Containing Small Amounts of Photoinitiator Overprinted with an Unreactive Coating Containing Photoinitiator Irgacure 127 was added to the magenta and black inks above. Two different black inks, each containing a different level of Irgacure were prepared. The process from the above Example was repeated using the yellow and cyan ink without any photoinitiator and, the magenta containing 0.3% photoinitiator, a black ink containing 4.6% photoinitiator, and a black ink containing 7.2% photoinitiator. The photoinitiator used was again Irgacure 127 and it was ground into the Example 1A-1D inks (pastes at room temperature) using methods known to those skilled in the art to an acceptable particle size usable in offset printing to produce Examples 2A to 2E. The Example 2A-2E inks were printed, coated, and then cured at 40 m/min at 80 W/cm according to the same procedure described in Example 1 above. Results are shown in Table 3:

TABLE 3

Examples 2A-2E initial thumb twist and IPA rub ratings

| Ink Example | Irgacure 127* | Initial Thumb Twist and Finger Rub |
|---|---|---|
| 2A Yellow | 0.0% | Pass |
| 2B Magenta | 0.3% | Pass |
| 2C Cyan | 0.0% | Pass |
| 2D Black | 4.6% | Fail |
| 2E Black | 7.2% | Pass |

*Reflects the amount of Irgacure 127 added to the Example 1A-1D inks to produce Example 2A-2E inks It is unexpected that such a small amount of photoinitiator is required in the UV inks in order to generate acceptable initial UV curing. It also shows that full cure can be achieved using less photoinitiator in the ink than is required to achieve a comparable result using only water-based coating over an ink with a high load of photoinitiator (see comparative Example 3.) Also unexpected is that the black was even able to cure under conditions of so little UV exposure. Other means of curing black ink required more UV energy. (See comparative examples 3 and 4 to follow.)

Comparative Example 3: EC Inks with Photoinitiator Coated with Photoinitiator-Free Overcoat In the present Example, Example 3A-3D inks were cured prior to being overcoated.

The photoinitiator-free inks of Example 1A-1D were modified to include Irgacure 127 photoinitiator at various levels to produce Examples 3A-3D. The UV exposure level used was also the same as in Example 1. Using an offset roller method, the Example 3A-3D inks were printed on coated proofing paper BYK Chart 2810 at typical commercial printing densities. The inks were then exposed to radiation from a medium pressure mercury vapor UV lamp per the conditions of Example 1. The water-based coating Rycoline 181349 as received (i.e. without any photoinitiator in the coating) was coated over the cured ink and thermally dried.

The process order of exposing the construction to UV light was different, with the Example 3A-3D inks cured prior to being overcoated and thermally dried.

The construction was thus as follows:
Substrate—EC Ink (Examples 3A-3D)—Rycoline 181349 coating w/o photoinitiator The following differences from Example 1 are noted:
The Example 3A-3D inks contain photoinitiator whereas the Example 1A-1D inks are photoinitiator-free The cure results showed a clear dependence on color. Example 3A Yellow cured the easiest with Example 3D Black being more difficult to cure:

TABLE 4

Examples 3A-3D initial thumb twist resistance test results w/various levels of Irgacure 127

| Example | 1.5% Irg. 127 | 3.0% Irg. 127 | 6.0% Irg. 127 | 9.0% Irg. 127 | 12.0% Irg. 127 |
|---|---|---|---|---|---|
| 3A Yellow | Fail | Pass | Pass | Pass | — |
| 3B Magenta | Fail | Fail | Pass | Pass | — |
| 3C Cyan | Fail | Pass | Pass | Pass | — |
| 3D Black | — | Fail | Fail | Fail | Fail |

A similar pattern was seen for the solvent rub resistance tests.

TABLE 5

Example 3A-3D Isopropanol double rubs resistance to breakthrough w/various levels of Irgacure 127

| Example | 0.75% Irg. 127 | 1.5% Irg. 127 | 3.0% Irg. 127 | 6.0% Irg. 127 | 9.0% Irg. 127 | 12.0% Irg. 127 |
|---|---|---|---|---|---|---|
| 3A Yellow | 6.5 | 14 | 39 | 51 | 34 | — |
| 3B Magenta | — | 8.5 | 4.5 | 35 | 9.5 | — |
| 3C Cyan | — | 4 | 11.5 | 22.5 | 33 | — |
| 3D Black | — | — | 4.5 | 5 | 7 | 8.5 |

Cure Observations for Example 3A-3D Compared to Examples 1 and 2:

Yellow ink FLCWB2445033 required 3% photoinitiator to cure in this construction. (Wet-trapped under water-based coating containing 7.7% Irgacure 127, no added photoinitiator was required to cure the Example 2A yellow.)

Magenta ink FLCWB4445037 required 6% photoinitiator to cure in this construction. (Wet-trapped under waterbase coating containing 7.7% Irgacure 127, 0.3% added photoinitiator was required to cure the Example 2B magenta.)

Cyan ink FLCWB5445039 required 3% photoinitiator to cure in this construction. (Wet-trapped under waterbase coating containing 7.7% Irgacure 127, no added photoinitiator was required to cure the Example 2C cyan.)

Black ink FLCWV9445043 would not cure in this construction even when 12% Irgacure 127 was added to the ink. (Wet-trapped under waterbase coating containing 7.7% Irgacure 127, 7.2% added photoinitiator was required to fully cure the Example 2E black.)

Comparative Example 4: EC Inks with Photoinitiator without Overcoat

Conventional UV printing (current state of the art) typically does not use a coating over the ink. The ink is exposed in each print station to a UV lamp, curing it and rendering it hard, before it moves to the next print station. The objective of this example is to determine how much photoinitiator must be added to the inks of Example 1 in order for them to cure to commercially acceptable levels using conventional processing. This functions as a baseline for evaluating the improvements in performance seen in Examples 1 and 2 relative to conventional processing. Substrates, print densities, coating application thickness and UV exposure level are the same as those reported in Example 1, e.g., print densities were greater than the following: Black=1.70, Cyan=1.45, Magenta=1.50, Yellow=1.05.

Data is for thumb-twist resistance upon exposure to UV at conditions equivalent to those used in Examples 1-3 (Hg Vapor lamp, 40 m/min×80 W/cm).

TABLE 6

Examples 4A-4D initial thumb twist results

| Example | 1% Irg. 127 | 3% Irg. 127 | 6% Irg. 127 | 9% Irg. 127 | 12% Irg. 127 | 15% Irg. 127 |
|---|---|---|---|---|---|---|
| 4A Yellow | Fail | Pass | Pass | Pass | — | — |
| 4B Magenta | Fail | Pass | Pass | Pass | — | — |

TABLE 6-continued

Examples 4A-4D initial thumb twist results

| Example | 1% Irg. 127 | 3% Irg. 127 | 6% Irg. 127 | 9% Irg. 127 | 12% Irg. 127 | 15% Irg. 127 |
|---|---|---|---|---|---|---|
| 4C Cyan | Fail | Fail | Fail | Pass | — | — |
| 4D Black (1 cure pass) | — | Fail | Fail | Fail | Fail | Fail |
| 4D Black | — | — | — | — | Pass* | — |

*= 160 W/cm, 40 mpm UV lamp setting

The black is shown not to cure at the UV exposure conditions of Examples 1 and 2 regardless of the amount of photoinitiator it contains. In order for the black to cure with a level of 14.9% photoinitiator under conventional UV processing, it had to be passed under the lamp 3 times. Thus, for the black to cure conventionally it required triple the UV dosage and 14.9% photoinitiator whereas in Example 2 it cured with one pass and a level of photoinitiator of 7.2% in the ink and 7.7% in the coating for an identical total of 14.9%. The processes of Examples 1 and 2 are thus significantly more efficient in terms of utilization of UV energy in effecting cure than the conventional UV processing as described in Example 4.

An advantage for the technology of Examples 1A-1D and 2A-2D vs. conventional UV printing is that for the situation where the inks are wet trapped under a coating that contains photoinitiator, both in situations where there is additional photoinitiator in the ink and situations where it is not required, only one set of lamps is required to cure the entire composite. This results in major energy use reduction relative to conventional printing. On a press with 100 cm long bulbs with the typical double lamp set for each print station at a typical energy consumption for Hg vapor lamps of 160 W/cm, the electricity reduction will be 32 kW per lamp set that can be turned off. On a simple 4 color job with a UV coating, 5 lamp sets are typically in operation. If all but the lamp set on the coater can be turned off, the reduction would be 128 kW. The more colors are being printed, the more lamps that can be turned off, the greater the energy savings will be.

Example 5: EC Inks Containing No Photoinitiator Overprinted with an Unreactive Coating Containing Photoinitiator Blends of photoinitiators were tested. Two different blends of photoinitiators were prepared:

Bd 1—A 1:1 mixture of two Type I photoinitators; HMPP (2-hydroxy-2-methyl-1-phenylpropanone and TPO-L, ethyl(2,4,6-trimethylbenzoyl)-phenyl phosphinate.

Bd 2—A 1:1 mixture of Type I photoinitators and Type II photoinitators: 25 wt % HMPP, 25 wt % TPO-L, and 50 wt % Type II photoinitiator Omnipol BP (Di-ester of carboxymethoxybenzophenone and polytetramethyleneglycol 250).

Each blend was added to Rycoline 841349, a waterbase acrylic resin coating intended for graphic arts to provide a mixture containing ~9 wt % photoinitiator. Samples of the photoinitiator free Cyan ink used above were proofed in triplicate on paper using a Quick Peek™ ink proof roller.

In order to achieve commercial printing density, the unit was inked with approximately 0.04-0.07 grams of ink, then rolled out onto the paper. The waterbase/photoinitiator coatings were rolled over the wet ink using a 2-roll Harper Phantom™ handproofer setup without doctor blade, 360 line per inch×4.23 bcm volume anilox roller. The resulting proofs were air-dried for 2 minutes and then exposed to UV light from a medium pressure mercury lamp at various conditions. The conditions used in the tests (not all proofs exposed to all conditions) varied the UV dosage from 63-279 mJ/cm$^2$. The cure of each proof was tested using thumb twist and isopropanol rub tests as above. Representative results for various UV exposure doses are shown in Table 8 below. Isopropanol results are shown as an average of six separate tests; thumb twists results are the number that passed out of three proofs tested.

TABLE 7

Curing Results from Example 5 using Photoinitiator Bd1 or Bd 2

| | UV power mJ/cm$^2$. | thumb twist | isopropanol rubs |
|---|---|---|---|
| Photoinitiator Blend 1 | 279 | — | — |
| | 192 | 3/3 | 56.8 |
| | 141 | 3/3 | 34.5 |
| | 88 | 3/3 | 26.3 |
| Photoinitiator Blend 2 | 279 | 3/3 | 69.8 |
| | 192 | 3/3 | 42.3 |
| | 141 | 3/3 | 35.8 |
| | 114 | 3/3 | 21.5 |
| | 88 | 3/3 | 16.0 |

As seen in Table 7, excellent curing results were seen using blends of photoinitiators, including blends of Type I and Type II photoinitiators.

The following section of Examples shows the performance of color traps, wet on wet constructs of different colored printing inks, in the invention. The photoinitiator free inks used in these Examples are the same as in Examples 1-4.

Example 6: Determination of the Weight Per Unit Area of Inks and Coatings

Color density alone can be an inadequate measure of the amount of ink that is present on a printed substrate. For example, small changes in the weight of ink per unit area have a much larger effect on the measured color for magenta than is the case for identical changes in weight per unit area of the yellow and cyan inks. Weight per unit area of the inks and coatings were therefore determined for use in analysis of the curing data.

Pieces of coated proofing paper were cut in rectangles, 10.0 cm×2.5 cm. (25.0 cm$^2$), from the white portion of BYK Chart 2810 proofing forms. Each piece was weighed on an analytical balance. The pieces were then taped back into the forms from which they were cut by taping along the edges on the back (non-printed) side of the form. Proofs made using the various inks and coatings of the Examples were prepared on the proofing forms, then the 25.0 cm$^2$ piece of printed or coated stock was carefully removed from the tape holding it to the form, handling it only by the edges, and weighed again. EC inks were applied using a Quick Peek rollout system and could be weighed immediately.

As with each following Example, the waterbase coatings, Rycoline 841349 and Rycoline 4232-71-1, were applied using a bladed 2-roll Harper Phantom™ hand-proofer with a roll set consisting of a rubber roller with Shore A 45 durometer hardness and a 360 lpi×4.23 bcm anilox roller; pi=lines (of engraving) per inch of width of the roller, bcm=billion cubic microns per square inch of cell volume on the roller, and were dried using forced air blown on the print at room temperature, and then equilibrated at room conditions for one hour before being reweighed.

The actual thickness of an ink layer was determined via using the density function of an X-Rite SpectroEye™ spectrophotometer. Thickness was predicted per a regression equation developed from a study of color density vs. ink film thickness.

Cyan, magenta and yellow ink prints prepared above were measured for color density using an X-Rite SpectroEye™ spectrodensitometer. To ensure that there were no differences in optical diffraction with the following examples, the preceding ink samples were coated with Rycoline 4232-71-1, a photoinitiator-containing coating and exposed to a medium pressure mercury vapor UV lamp set for a dosage of 115-125 mJ/cm² to cure as described below. 5 readings obtained from an X-Rite SpectroEye™ REV D. on the appropriate filter were averaged to obtain the color value. Results are shown in the graphs in FIG. 1 (cyan), FIG. 2 (magenta) and FIG. 3 (Yellow). The linearity of the relationship of ink weight vs. color density was acceptable within the range of measurement. The relationships for each color and ink weight seen in the graphs are:

$$Wt_C \text{ (g/m2)} = 2.622 \, D_C - 3.3808$$

$$Wt_M \text{ (g/m2)} = 1.4842 \, D_M - 1.1137$$

$$Wt_Y \text{ (g/m2)} = 4.0349 \, D_Y - 4.0861$$

Where Wt=the weight of the ink in grams per square meter
D=the absolute color density (status T, dry ink)
C=cyan
M=magenta
Y=yellow The relationships of weight per square meter vs. color strength in the inks vary by color. This is because the experimental inks were selected to trap ink layers in C→M→Y order with black either first down (high tack) or last down (low tack). In general it is beneficial to put a strong, thin ink layer down first, followed by increasingly thicker ink layers in order to maximize the trap quality, for Example:

For cyan's 1.40-1.50 commercially relevant, absolute color density range, the predicted ink weight per square meter varies from 0.34 to 0.59 grams. This is a difference of 0.25 grams, and a 73.5% increase in weight from the initial value to the end of the range.

For magenta, the commercially relevant region is also 1.40-1.50 absolute color density, and the predicted ink weight per square meter varies from 0.96 to 1.09 grams. This is a difference of 0.13 grams, or a 13.5% increase in weight from the initial value to the end of the range.

Figure 3:
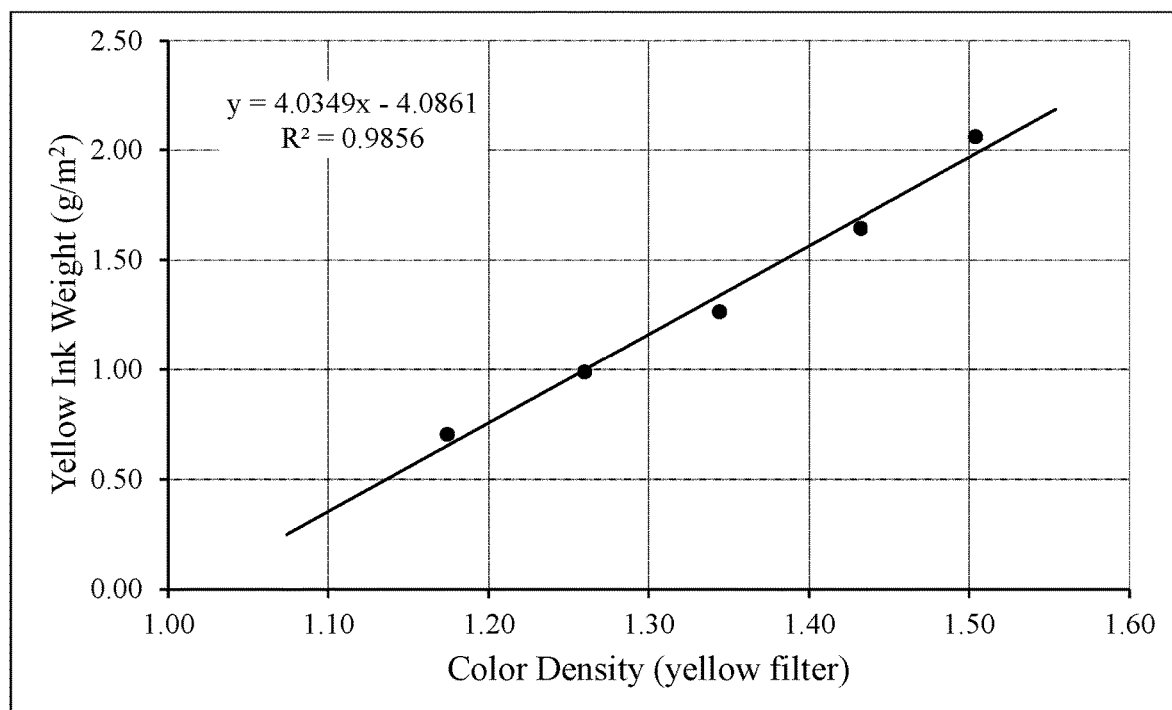
FIG. 3 is a graph showing g/m² of ink vs measured color density of yellow ink.

For yellow, the commercially relevant region for process printing is generally 0.95-1.05 absolute color density, though spot color densities routinely run significantly higher. FIG. 3 also shows that for an increase of color density of 1.20-1.30 (outside the commercially relevant range), the weight of ink per square meter would range from 0.79 to 1.17 grams, an increase of 0.38 grams or a 48% increase from the beginning to end of the range.

These numbers illustrate the inadequacy discussed above of looking at color density alone as a measure of "how much ink" is present on a surface. Small changes in the weight of ink per unit area have a much larger effect on the measured color for one color than another. Thus it is best to look at traps in terms of an estimated weight per unit area and tie this back to the curing performance.

The weight per unit area of the waterbase coatings was estimated for the dried coatings after removal of liquids. Rycoline 841349, a non-EC curing dispersion of mostly acrylate resins was tested on a Sartorius Solids Tester and found to be 36.9% solids. The density of a laid down Rycoline 841349 layer was evaluated by applying the dispersion to BYK Chart 2810 coated paper with 25.0 cm² cutouts taped into place using a bladed 2-roll Harper Phantom™ hand-proofer as described above. The proofs were allowed to dry for 60 minutes at room conditions (73° F. and 13% RH) and then the cutout sections were weighed. A total of 8 proofs were measured.

The average tare weight of the samples was 0.68495 g. The average coated weight of the samples was 0.68595 g, an average increase of 0.00100 g, which translates to 0.40 g/m², (0.00100 g/25 cm²) (10,000 cm²/m²)=0.40 g/m².

The coating Rycoline 4232-71-1 is a mixture of 94% Rycoline 841349 and 6% photoinitiator. The composition of dried R4232-71-1 was calculated as:

| Material as Received | % | Raw Material (wet basis) | % |
|---|---|---|---|
| Rycoline 841349 | 94.0 | Coating Solids | 34.7 |
| | | Fugitive Liquids | 59.3 |
| Photoinitiator blend | 6.0 | TPO-L | 3.0 |
| | | HMPP | 3.0 |

The solids portion of Rycoline 4232-71-1 as received is 40.7% of the total amount (wet) and thus dried the composition is: Coating Solids 85.3%, photoinitiator TPO-L 7.4% photoinitiator HMPP 7.4%. Therefore, on a dry basis, photoinitiator constituted 14.8% of total solids. The weight per area of a dried Rycoline 4232-71-1 layer as applied here is 0.40 g/m², meaning the photoinitiator present per layer of water base coating is 0.059 g/m², i.e. ((0.40 g/m²)(14.8%) =0.059 g/m²).

Example 7: Curing of Wet Trapped Cyan and Magenta EC Ink Layers Containing No Photoinitiator Over a Non-Reactive Primer Layer Comprising Photoinitiator Bottom up curing refers to a multi-layer sample where photoinitiator free EC inks are printed over a non-reactive primer layer that contains photoinitiator. A non-reactive overcoat may be applied on top of the ink layers, see the "bottom up" configuration shown in FIG. 4. In this configuration, the only possible source of free radicals during cure comes from the interaction of UV light penetrating through the inks to the primer. The free radicals must then presumably migrate "up" through the inks in order to cure them.

The traps of interest in these Examples were the same ones that are used to evaluate commercial 4-color printing; Purple (magenta over cyan), Green (yellow over cyan) and Red (yellow over magenta) Black is not usually trapped in most 4-color printing schemes, so combinations with black were not tested.

Figure 4A:
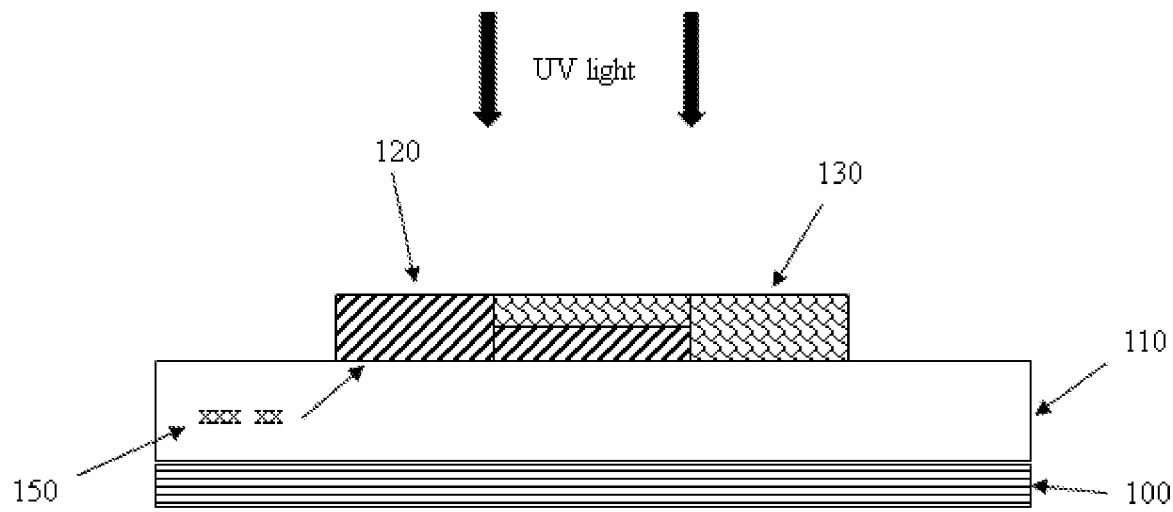
FIG. 4A is a schematic representation of a "Bottom Up" print configuration with no topcoat, magenta over cyan trap. 4A has no topcoat, while 4B has a topcoat.

Referring to FIG. 4(A), Rycoline 4232-71-1, non-EC coating with photoinitiator (110) was applied to BYK Chart 2810 coated paper (100) with a bladed 2-roll Harper Phantom™ hand-proofer as described above, and dried to provide a primer layer having 0.059 g/m² photoinitiator. A first stripe of EC cyan ink with no photoinitiator (120) was laid down over the primer layer (110). Then a stripe of EC magenta ink with no photoinitiator (130) was laid down, half over the wet, first down, cyan ink (120) and half directly on the primer (110). Free radicals (150) are generated in primer layer (110), and migrate to the EC cyan ink (120) and EC magenta ink (130). The coatings were air dried on the benchtop at room temperature.

The proofs were passed under a medium pressure mercury vapor UV lamp set for a dosage of 115-125 mJ/cm$^2$. The nominal belt speed was 115 fpm (35 m/min). The nominal power was 30% on a 160 W/cm UV bulb. At full power, this would correlate with a run speed of 105 m/min; and with a typical double lamp set as is used commercially, 210 m/min would achieve the same energy dosage. Those skilled in the art are aware that these are speeds of commercial interest. The typical ratios of energies by UV fraction, as measured in Example 1 using EIT "UV PowerPuck II™" radiometer, were:

| UV Type | Dose (mJ/cm$^2$) | Intensity (mW/cm$^2$) |
|---|---|---|
| $UV_A$ | 54 | 2027 |
| $UV_B$ | 56 | 2396 |
| $UV_C$ | 11 | 429 |

In the first tests with these color traps, a magenta over cyan trap was printed over R4232-71-1 as a primer, and had no top coating. Under these conditions with no top coating, some cuing was observed however, none of these constructions cured at a commercially acceptable level and all smeared unacceptably.

Figure 4B:
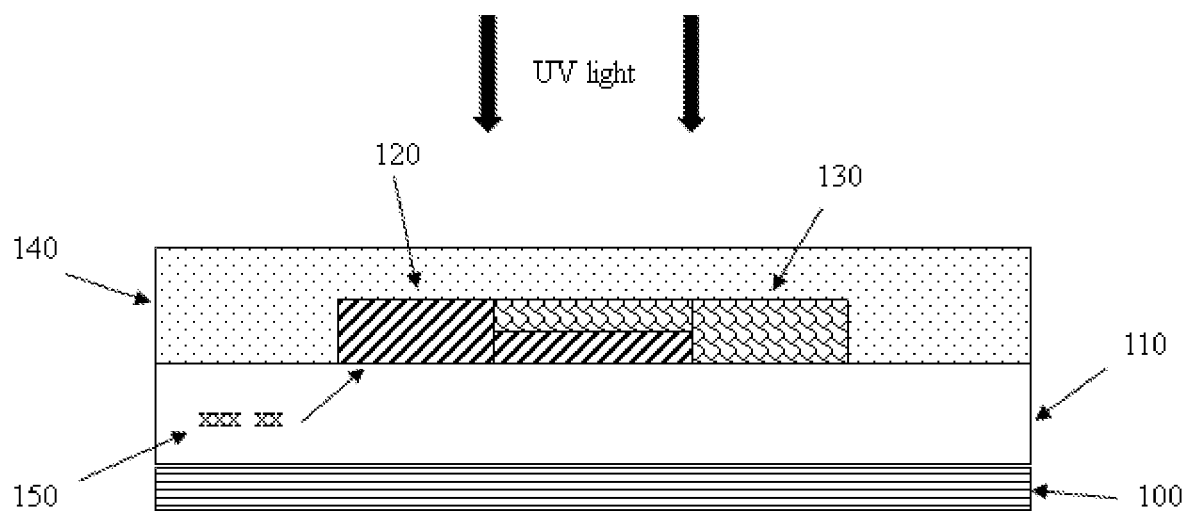
FIG. 4B is a schematic representation of a "Bottom Up" print configuration with a topcoat, magenta over cyan trap.

Example 8: Curing of Wet Trapped Cyan and Magenta EC Ink Layers Containing No Photoinitiator Over a Non-Reactive Primer Layer Comprising Photoinitiator, Over Coated with a Photoinitiator Free Top Coat The procedures of Experiment 7 were repeated except that a Rycoline 841349 waterbase acrylic coating having no photoinitiators was wet trapped over the inks and dried on the desk top prior to exposure to UV light as described above. Referring to FIG. 4(B), Rycoline 4232-71-1, non-EC coating with photoinitiator was applied as a primer (110) to BYK Chart 2810 coated paper (100) with a bladed 2-roll Harper Phantom™ hand-proofer as described above, and dried to provide a primer layer having 0.059 g/m$^2$ photoinitiator. A first stripe of EC cyan ink with no photoinitiator (120) was laid down over the primer layer (110). Then a stripe of EC magenta ink with no photoinitiator (130) was laid down, half over the wet, first down, cyan ink (120) and half directly on the primer (110). Free radicals (150) are generated in primer layer (110), and migrate to the EC cyan ink (120) and EC magenta ink (130). Rycoline 841349 coating with no photoinitiator (140) was applied over the inks. Proof sections were "n-C" and "n-M," for single color layers, wherein "n" is an integer referring to print number, "C" is cyan ink, and "M" is magenta ink. Thus, Pr #1-C is print number 1 of cyan ink, and Pr #1-M is print number 1 of magenta ink.

After the proofs were cured, the color densities were measured in order to establish the weight of the inks that were present. It was assumed that the traps were the sum of the ink weight from each color. As can be seen in FIG. 4(B), there was a sizeable area on the proofs available to measure the density of each individual color. The numbers reported are averages of 5 such measurements. Each proof was then tested for thumb twist resistance and finger rub resistance. While not all of the ink constructs cured to an acceptable degree, it can be seen in Table 8, that many traps of magenta over cyan fully cured (proofs 4-6), as well as many of the single layers.

TABLE 8

Curing results cyan/magenta trap, primer provides 0.059 g/m2 of photoinitiator to the system

| | | Test of Individual Inks | | Test of Individual Inks | |
|---|---|---|---|---|---|
| Pr# | Color Density | Thumb Twist | Finger Rub | Thumb Twist | Finger Rub |
| 1-C | 1.90 | Fail | Fail | Fail | Fail |
| 1-M | 1.98 | Pass | Fail | | |
| 2-C | 1.86 | Pass | Fail | Fail | Fail |
| 2-M | 1.75 | Pass | Pass | | |
| 3-C | 1.66 | Pass | Pass | Fail | Fail |
| 3-M | 1.50 | Pass | Pass | | |
| 4-C | 1.62 | Pass | Pass | Pass | Pass |
| 4-M | 1.48 | Pass | Pass | | |
| 5-C | 1.43 | Pass | Pass | Pass | Pass |
| 5-M | 1.38 | Pass | Pass | | |
| 6-C | 1.38 | Pass | Pass | Pass | Pass |
| 6-M | 1.27 | Pass | Pass | | |

TABLE 9

Photoinitiator available from the primer as a percentage of the weight of mono layers of inks and ink traps

| Pr # | Estimated Individual Ink Weight (g/m$^2$) | Individual Inks Resistance Tests (TT & FR) | Photoinitiator as a portion of the ink PI/(PI + Ink) | Estimated Weight of Trap Ink-1 + Ink-2 (g/m$^2$) | Trapped Inks Resistance Tests (TT & FR) | Photoinitiator as a portion of the Trap PI/(PI + Trap) |
|---|---|---|---|---|---|---|
| 1-C | 1.61 | Fail | 3.5% | 3.43 | Fail | 1.7% |
| 1-M | 1.82 | Fail | 3.1% | | | |
| 2-C | 1.51 | Fail | 3.8% | 2.98 | Fail | 1.9% |
| 2-M | 1.48 | Pass | 3.8% | | | |
| 3-C | 0.96 | Pass | 5.8% | 2.07 | Fail | 2.8% |
| 3-M | 1.11 | Pass | 5.1% | | | |
| 4-C | 0.88 | Pass | 6.3% | 1.96 | Pass | 2.9% |
| 4-M | 1.09 | Pass | 5.2% | | | |
| 5-C | 0.38 | Pass | 13.5% | 1.32 | Pass | 4.3% |
| 5-M | 0.94 | Pass | 5.9% | | | |
| 6-C | 0.23 | Pass | 20.6% | 1.00 | Pass | 5.6% |
| 6-M | 0.77 | Pass | 7.1% | | | |

In contrast, in this construction, if there were no photoinitiator in the primer, the average amount of photoinitiator per ink layer generally required to sustain cure at similar UV light exposure levels is:

| | |
|---|---|
| 6.50% for yellow | 7.0% for M/Y trap |
| 7.50% for magenta | 7.4% for C/Y trap |
| 8.25% for cyan | 7.9% for C/M trap |

As seen in table 9, under conditions of the invention a number of cyan/magenta traps of the invention cured at half that level, and there is little penalty and possibly even an advantage for monolayers as well.

Example 10: Curing of Wet Trapped EC Ink Layers Containing No Photoinitiator Over Coated with a Top Layer Containing Photoinitiator The Examples that follow deal with "Top Down" constructions, i.e., the photoinitiator is found in the over coat (not the primer). The following samples were prepared in a manner similar to the above. A first stripe of ink was laid down directly on the substrate. Then a second stripe of a different colored ink was laid down, half over the wet, first down ink and half directly on the substrate. See FIGS. 5 to 7.

Cyan/Magenta Traps

Figure 5:
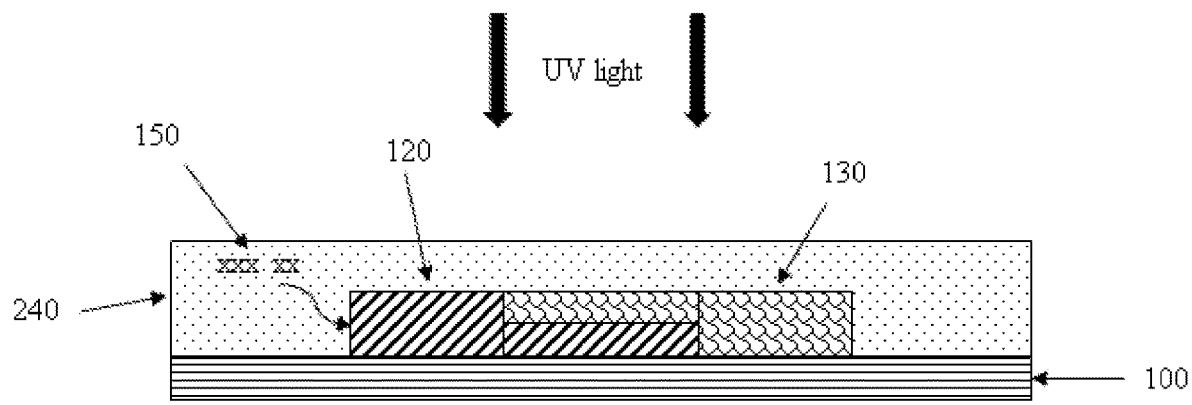
FIG. 5 is a schematic representation of a "Top Down" print configuration, magenta over cyan trap.

Prints #7-C to 11-C and 7-M to 11-M are made using Cyan/Magenta traps as in the previous example. Referring to FIG. 5, an EC magenta ink with no photoinitiator (130) was applied to substrate (100). Then a stripe of EC cyan ink with no photoinitiator (120) was laid down, half over the wet, first down, magenta ink (130) and half directly on the substrate (100). Rycoline 4232-71-1, non-EC coating with photoinitiator was applied as an over coat (240). Free radicals are generated in the non-EC coating with photoinitiator (240) and migrate to the EC cyan ink with no photoinitiator (120), and EC magenta ink with no photoinitiator (130). Proof sections were "n-M" and "n-C," wherein "n" is an integer referring to print number, "M" is magenta ink, and "C" is cyan ink. Curing of these top down samples was clearly more effective than the bottom up samples above.

TABLE 10

Top Down curing results cyan/magenta trap, top coat provides 0.059 g/m2 of photoinitiator to the system

| | | Test of Individual Inks | | Test of Trapped Inks | |
|---|---|---|---|---|---|
| Pr# | Color Density | Thumb Twist | Finger Rub | Thumb Twist | Finger Rub |
| 7-C | 1.33 | Pass | Pass | Pass | Pass |
| 7-M | 1.86 | Pass | Pass | | |
| 8-C | 1.48 | Pass | Pass | Pass | Pass |
| 8-M | 1.77 | Pass | Pass | | |
| 9-C | 1.71 | Pass | Pass | Pass | Pass |
| 9-M | 1.54 | Pass | Pass | | |
| 10-C | 1.99 | Pass | Pass | Pass | Pass |
| 10-M | 1.54 | Pass | Pass | | |
| 11-C | 1.69 | Pass | Pass | Pass | Pass |
| 11-M | 1.34 | Pass | Pass | | |

Remarkably, as seen in Table 10 above, every proof made using the magenta over cyan traps cured with the photoinitiator in the topcoat achieved an acceptable result at the exposure conditions. The lowest photoinitiator content as a percentage of the trapped ink was 1.8% photoinitiator by weight. For the individual inks, the lowest recorded acceptable value for the cyan was 3.0% photoinitiator, and for the magenta it was 3.4% photoinitiator (see Table 11).

The data in Table 11 is arranged to proceed from lowest total effective photoinitiator concentration in the traps to the highest to make it easier to compare the two tables.

TABLE 11

Photoinitiator from the top coat as a percentage of the weight of mono-layers and traps for top down tests, coating magenta over cyan

| Pr# | Estimated Individual Ink Weight g/m² | Individual Inks Resistance tests (TT & FR) | Photoinitiator In Proportion to Ink | Estimated Weight of Trap Ink 1 + Ink 2 g/m² | Trapped Inks Resistance Tests (TT & FR) | Photoinitiator In Proportion to Trap |
|---|---|---|---|---|---|---|
| 10-C | 1.84 | Pass | 3.1% | 3.01 | Pass | 1.9% |
| 10-M | 1.17 | Pass | 4.8% | | | |
| 9-C | 1.10 | Pass | 5.1% | 1.75 | Pass | 3.3% |
| 9-M | 0.65 | Pass | 8.3% | | | |
| 8-C | 0.51 | Pass | 10.5% | 1.76 | Pass | 3.2% |
| 8-M | 1.25 | Pass | 4.5% | | | |
| 11-C | 1.05 | Pass | 5.3% | 1.92 | Pass | 3.0% |
| 11-M | 0.87 | Pass | 6.3% | | | |
| 7-C | 0.10 | Pass | 38.1% | 1.60 | Pass | 3.6% |
| 7-M | 1.50 | Pass | 3.8% | | | |

The "Top Down" cure was superior to the "Bottom Up" cure for magenta over cyan traps in that less photoinitiator was needed for successful cure, i.e., 1.9% vs. 2.6% photoinitiator in the trap (31% less by weight)

3.1% vs. 5.8% photoinitiator in the cyan monolayer (40% less by weight)

Assuming that the photoinitiator load in conventional printing would be 7.5% in magenta and 8.3% in cyan, with a 50/50 trap averaging 7.9% photoinitiator, the advantage of the top down system is even greater:

1.9% vs. 7.9% photoinitiator in the trap (77% less by weight)

3.1% vs. 8.3% photoinitiator in the cyan monolayer (64% less by weight)

3.8% vs. 7.5% photoinitiator in the magenta monolayer (55% less by weight).

Yellow Over Cyan Traps

Figure 6:
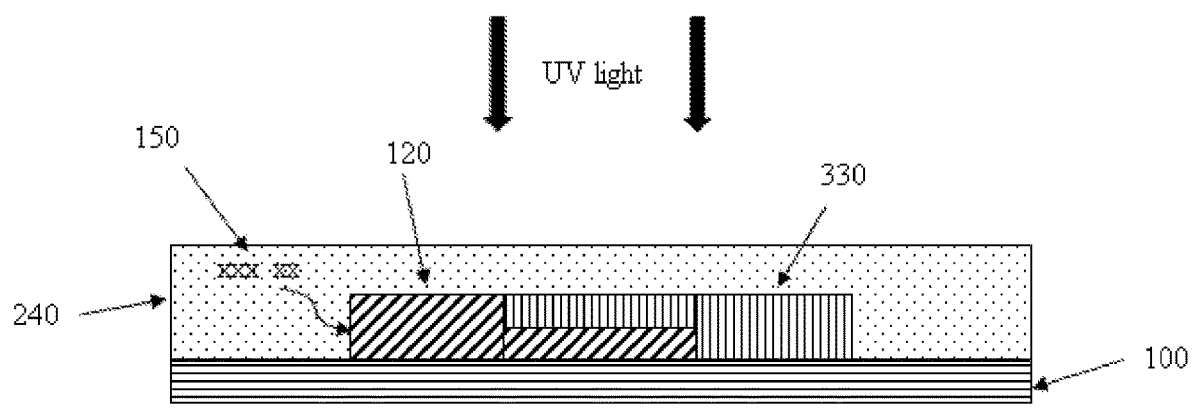
FIG. 6 is a schematic representation of a "Top Down" print configuration, yellow over cyan trap.

Following the procedures above, samples of a second "top down" construction, yellow over cyan traps, samples 12-16 (see FIG. 6) were prepared. Referring to FIG. 6, an EC cyan ink with no photoinitiator (120) was applied to substrate (100). Then a stripe of EC yellow ink with no photoinitiator (330) was laid down, half over the wet, first down, cyan ink (120) and half directly on the substrate (100). Rycoline 4232-71-1, non-EC coating with photoinitiator was applied as an over coat (240). Free radicals are generated in the non-EC coating with photoinitiator (240) and migrate to the EC cyan ink with no photoinitiator (120), and EC yellow ink with no photoinitiator (330). Proof sections were "n-C" and "n-Y," wherein "n" is an integer referring to print number, "C" is cyan ink, and "Y" is yellow ink. This trap did not cure as well as the magenta over cyan trap, although it did cure acceptably at commercially acceptable print densities (see Table 12). The table is arranged in descending order of color density for the yellow. The individual layers of yellow cure all the way to a density of 1.51, well beyond the normal printed density of 0.95-1.05, and the reported density is an average of 5 readings.

TABLE 12

Top Down curing results yellow/cyan trap, top coat provides 0.059 g/m2 of photoinitiator to the system

| | | Tests of Individual Inks | | Tests of Trapped Inks | |
|---|---|---|---|---|---|
| Pr # | Color Density | Thumb Twist | Finger Rub | Thumb Twist | Finger Rub |
| 12-C | | Fail | Fail | Fail | Fail |
| 12-Y | 1.51 | Pass | Pass | | |
| 13-C | 1.95 | Pass | Pass | Fail | Fail |
| 13-Y | 1.32 | Pass | Pass | | |

TABLE 12-continued

Top Down curing results yellow/cyan trap, top coat provides 0.059 g/m2 of photoinitiator to the system

| | | Tests of Individual Inks | | Tests of Trapped Inks | |
|---|---|---|---|---|---|
| Pr # | Color Density | Thumb Twist | Finger Rub | Thumb Twist | Finger Rub |
| 14-C | 1.63 | Pass | Pass | Fail | Pass |
| 14-Y | 1.19 | Pass | Pass | | |
| 15-C | 1.50 | Pass | Pass | Pass | Pass |
| 15-Y | 1.15 | Pass | Pass | | |
| 16-C | 1.34 | Pass | Pass | Pass | Pass |
| 16-Y | 1.16 | Pass | Pass | | |

Single ink layers cured well. However, the traps did not seem to cure as readily. It is possible that yellow, which is a color that filters out blue light, and, to some extent, the longest wavelengths of UV light, was able to reduce the exposure of the cyan enough to inhibit the cure when dense print layers were made All monolayer examples of cyan ink ≤1.71 density passed. All the yellow monolayer examples also passed up to a density of 1.51 in proof 12-Y. All these values are substantially above the normal upper limits of 1.50 for cyan density and 1.10 yellow density typically seen commercial printing. The trap represented by Prints 14-C and 14-Y failed. Both the cyan density of 1.63 and the yellow density of 1.19 are above typical densities seen in commercial printing. At all densities more typical of commercial printing, the traps passed.

Figure 2:
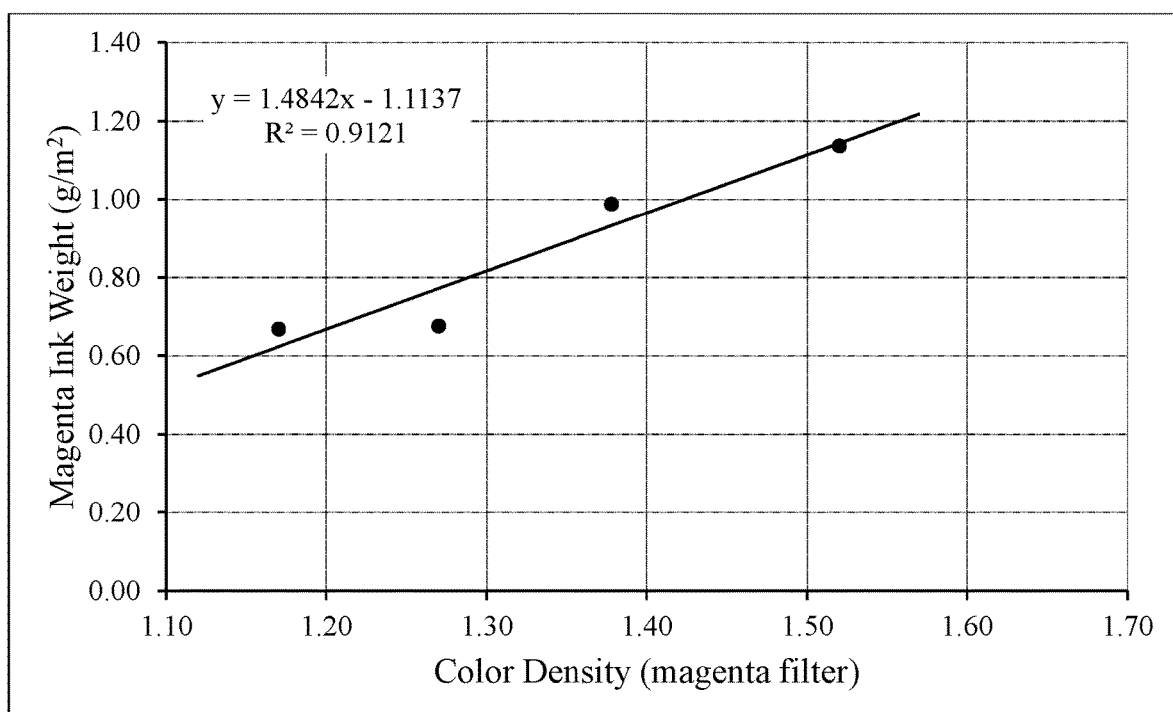
FIG. 2 is a graph showing g/m² of ink vs measured color density of magenta ink.

Using the equations in FIGS. 1 & 3 to correlate cyan and yellow ink densities with the actual weight per area present in each proof, estimates were made of the amount of ink present in the monolayers and traps for the yellow over cyan proofs (see Table 13).

Color vs. Film Weight, prediction for Cyan:
$$g/m^2 = 2.622 \text{ (Cyan Color Density)} - 3.3808$$

Color vs. Film Weight, prediction for Magenta:
$$g/m^2 = 1.4842 \text{ (Magenta Color Density)} - 1.1137$$

Color vs. Film Weight, prediction for Yellow:
$$g/m^2 = 4.0349 \text{ (Yellow Color Density)} - 4.0861$$

TABLE 13

Photoinitiator from the top coat as a percentage of the weight of mono-layers and traps for top down tests, coating yellow over cyan

| Pr# | Estimated Individual Ink Weight g/m² | Individual Inks Resitance tests (TT & FR) | Photoinitiator In Proportion to Ink | Estimated Weight of Trap Ink 1 + Ink 2 g/m² | Trapped Inks Resistance Tests (TT & FR) | Photoinitiator In Proportion to Trap |
|---|---|---|---|---|---|---|
| 12-C | 1.46 | Fail | 3.9% | 3.48 | Fail | 1.7% |
| 12-Y | 2.02 | Pass | 2.8% | | | |
| 13-C | 1.73 | Pass | 3.3% | 2.97 | Fail | 1.9% |
| 13-Y | 1.25 | Pass | 4.5% | | | |

TABLE 13-continued

Photoinitiator from the top coat as a percentage of the weight of mono-layers and traps for top down tests, coating yellow over cyan

| Pr# | Estimated Individual Ink Weight g/m² | Individual Inks Resitance tests (TT & FR) | Photoinitiator In Proportion to Ink | Estimated Weight of Trap Ink 1 + Ink 2 g/m² | Trapped Inks Resistance Tests (TT & FR) | Photoinitiator In Proportion to Trap |
|---|---|---|---|---|---|---|
| 14-C | 0.90 | Pass | 6.2% | 1.61 | Fail | 3.5% |
| 14-Y | 0.71 | Pass | 7.7% | | | |
| 15-C | 0.54 | Pass | 9.8% | 1.10 | Pass | 5.1% |
| 15-Y | 0.55 | Pass | 9.6% | | | |
| 16-C | 0.13 | Pass | 30.8% | 0.74 | Pass | 7.4% |
| 16-Y | 0.61 | Pass | 8.8% | | | |

Notably, comparing the yellow over cyan proofs (series 12-16) vs. the magenta over cyan proofs (series 7-11) shows that the traps in the Cyan/Yellow case require at least 3.3% photoinitiator to cure whereas for the Cyan/Magenta case only half that much photoinitiator was required to cure the trap (table 13). In both trap sequences, the photoinitiator in the coating required to cure the monolayers was comparable.

Yellow Over Cyan Traps, Photoinitiator Added to Cyan Layer

The procedures used in the preceding evaluation of yellow over cyan traps were repeated except that 1.85 wt % Omnipol TX, a di-ester of carboxymethoxy thioxanthone and polytetramethyleneglycol 250 type II photoinitiator, and 1.85 wt % of the amine synergist 1-ethylhexyl-4-dimethyl-aminobenzoate was added to the cyan ink, wt % based on the total weight of the resulting cyan ink composition. Results based on percentage of photoinitiator are shown in Table 14.

TABLE 14

Photoinitiator from the top coat and cyan ink as a percentage of the weight of mono-layers and traps for top down tests, coating yellow over cyan

| Pr# | Estimated Individual Ink Weight g/m² | Individual Inks Resistance tests (TT & FR) | Photoinitiator In Proportion to Ink | Estimated Weight of Trap Ink 1 + Ink 2 g/m² | Trapped Inks Resistance Tests (TT & FR) | Photoinitiator In Proportion to Trap |
|---|---|---|---|---|---|---|
| 22-C | 1.55 | Pass | 5.5% | 3.15 | Fail | 2.7% |
| 22-Y | 1.60 | Pass | 5.3% | | | |
| 23-C | 1.92 | Pass | 4.8% | 2.57 | Pass | 3.6% |
| 23-Y | 0.65 | Pass | 10.0% | | | |
| 24-C | 1.27 | Pass | 6.2% | 2.61 | Pass | 3.1% |
| 24-Y | 1.34 | Pass | 6.0% | | | |
| 25-C | 0.92 | Pass | 7.8% | 2.13 | Pass | 3.5% |
| 25-Y | 1.21 | Pass | 6.4% | | | |
| 26-C | 0.48 | Pass | 12.5% | 1.49 | Pass | 4.4% |
| 26-Y | 1.01 | Pass | 7.3% | | | |
| 27-C | 0.08 | Pass | 43.4% | 0.95 | Pass | 6.0% |
| 27-Y | 0.87 | Pass | 8.1% | | | |

Curing results are improved over the previous yellow over cyan proofs (see Table 13). In this case, the yellow over cyan traps cure when there is 4.8% photoinitiator available to the cyan layer and 3.1% available to the trap.

Yellow Over Magenta Traps.

The third "top down" construction examined was a yellow over magenta trap (see FIG. 7). Referring to FIG. 7, an EC magenta ink with no photoinitiator (130) was applied to substrate (100). Then a stripe of EC yellow ink with no photoinitiator (330) was laid down, half over the wet, first down, magenta ink (130) and half directly on the substrate (100). Rycoline 4232-71-1, non-EC coating with photoinitiator was applied as an over coat (240). Free radicals are generated in the non-EC coating with photoinitiator (240) and migrate to the EC magenta ink with no photoinitiator (130), and EC yellow ink with no photoinitiator (330). Proof sections were "n-M" and "n-Y," wherein "n" is an integer referring to print number, "M" is magenta ink, and "Y" is yellow ink. The reported density is an average of 5 readings. All the traps passed both the thumbtwist and finger rub tests, as did each of the monolayers. The magenta density varied from 1.89 to 1.27 and the yellow density from 1.33 to 0.94.

In this case as in the Cyan/Magenta traps, every proof cured. The monolayers all cured with photoinitiator content as low as 3.5% and the traps cured at levels well below that (see Tables 15 & 16). For the Cyan/Magenta, Yellow/Cyan and Yellow/Magenta traps, it appears that a level of photoinitiator in the coating above an equivalent value of 3.5% as a percent to ink by weight, can generally ensure proper curing of all the monolayers and traps that were examined.

TABLE 15

Top Down curing results yellow/magenta trap, top coat provides 0.059 g/m2 of photoinitiator to the system

| | Tests of Individual Inks | | Tests of Trapped Inks | |
|---|---|---|---|---|
| Pr # | Color Density | Thumb Twist | Finger Rub | Thumb Twist | Finger Rub |
| 18-M | 1.86 | Pass | Pass | Pass | Pass |
| 18-Y | 1.33 | Pass | Pass | | |
| 19-M | 1.89 | Pass | Pass | Pass | Pass |
| 19-Y | 1.13 | Pass | Pass | | |
| 21-M | 1.27 | Pass | Pass | Pass | Pass |
| 21-Y | 1.14 | Pass | Pass | | |

TABLE 16

Photoinitiator from the top coat as a percentage of the weight of monolayers and traps for top down tests, coating yellow over magenta

| Pr# | Estimated Individual Ink Weight g/m$^2$ | Individual Inks Resitance tests (TT & FR) | Photoinitiator In Proportion to Ink | Estimated Weight of Trap Ink 1 + Ink 2 g/m$^2$ | Trapped Inks Resistance Tests (TT & FR) | Photoinitiator In Proportion to Trap |
|---|---|---|---|---|---|---|
| 18-M | 1.64 | Pass | 3.5% | 2.92 | Pass | 2.0% |
| 18-Y | 1.28 | Pass | 4.4% | | | |
| 19-M | 1.70 | Pass | 3.4% | 2.18 | Pass | 2.6% |
| 19-Y | 0.48 | Pass | 10.9% | | | |
| 21-M | 0.78 | Pass | 7.1% | 1.28 | Pass | 4.4% |
| 21-Y | 0.51 | Pass | 10.4% | | | |

The above Examples have shown that Top-Down curing, placing photoinitiator in the top coat, is more efficient in curing ink layers than placing photoinitiator in the primer with a photoinitiator-free top coating for the cyan/magenta trap. It seems reasonable that this could extend across other colors and traps as well. Further, Top-Down curing is capable of curing the standard traps used in process printing at commercially interesting levels of print density for the monolayers and all major traps of cyan, magenta and yellow inks. Significantly, the amount of photoinitiator required to cure by the Top-Down method with photoinitiator in the non-reactive top coating is significantly less than what would be required to cure individual layers and traps of UV ink.

The invention claimed is:

1. A method for applying a layered construct of inks and/or coatings on a substrate, comprising:
   a) providing a substrate;
   b) providing one or more energy-curable compositions (A), comprising:
      i) a colorant,
      ii) one or more energy curable polymers, monomers and/or oligomers comprising reactive functional groups capable of polymerizing or crosslinking under actinic radiation; and
      iii) 0 wt % to 12 wt % of one or more photoinitiators, based on the total weight of composition (A);
   c) providing a non energy-curable composition (B), comprising:
      i) resins that do not comprise reactive functional groups capable of polymerizing or crosslinking under actinic radiation, and
      ii) 1 wt % to 20 wt % of one or more photoinitiators, based on the total weight of composition (B);
   wherein composition (B) comprises no components that are polymerizable when exposed to actinic radiation, and
   d) applying the compositions on the substrate, wherein one or more layers of compositions (A) are applied and then, before cure, overcoated with a layer of composition (B),
   wherein the layer of composition (B) is applied as a last down layer onto the top of the one or more uncured layers of compositions (A);
   e) drying the layer of composition (B); and
   f) actinically curing simultaneously all of the layers of composition (A) to create a cured print construct,
   wherein actinic radiation refers to electron beam or UV radiation, and actinically curing refers to curing by exposure to electron beam or UV light; and
   wherein the layers of composition (B) can be dried either before or after actinically curing simultaneously all of the layers of composition (A).

2. The method of claim 1, wherein at least one of the compositions (A) comprises no photoinitiators.

3. The method of claim 1, wherein the reactive functional groups comprise free radical polymerizable end groups.

4. The method of claim 1, wherein the reactive functional groups comprise acrylates, methacrylates, acrylamides, vinyl ethers, allyl ethers, maleates, itaconates, epoxides, oxetanes or mixtures thereof.

5. The method of claim 4, wherein the reactive functional groups comprise acrylates.

6. The method of claim 1, wherein the energy-curable polymers, monomers and/or oligomers further comprise hydroxyl, carboxyl, amino groups and/or their associated salts.

7. The method of claim 1, wherein the non energy-curable coating layer comprises from 3-15 wt % photoinitiators.

8. The method of claim 1, wherein two or more layers of composition (A) are applied.

9. The method of claim 1, wherein four or more layers of composition (A) are applied.

10. The method of claim 1, wherein at least one layer of composition (A) is a black process ink layer.

11. The method of claim 1, wherein each layer of composition (A) is independently selected from:
   a) a yellow process ink layer, comprising 0 wt % to 3 wt % photoinitiator, based on the total weight of the composition;
   b) a magenta process ink layer, comprising 0 wt % to 3 wt % photoinitiator, based on the total weight of the composition;
   c) a cyan process ink layer, comprising 0 wt % to 5 wt % photoinitiator, based on the total weight of the composition; or
   d) a black process ink layer, comprising 6 wt % to 12 wt % photoinitiator, based on the total weight of the composition.

12. The method of claim 11, wherein, when selected, the yellow process ink layer comprises 0.1-3 wt % photoinitiator, the magenta process ink layer comprises 0.1-3 wt % photoinitiator, the cyan process ink layer comprises 0.5-5% photoinitiator, and the black process ink layer comprises 8-12% photoinitiator.

13. The method of claim 1, wherein at least one of the energy-curable compositions (A) and/or non energy-curable compositions (B) further comprises an amine synergist.

14. The method of claim 1, wherein all of the layers of composition (A) are actinically cured simultaneously by light from a high-voltage mercury bulb, medium-voltage mercury bulb, xenon bulb, carbon arc lamp, metal halide bulb, UV-LED lamp, UV laser or combinations thereof.

15. The method of claim 1, wherein all of the layers of composition (A) are curable in a single pass under a medium pressure mercury vapor UV lamp at a speed of 40 meters/minute with a lamp power of 80 Watts/cm.

* * * * *